US010716154B2

(12) United States Patent
Feng

(10) Patent No.: US 10,716,154 B2
(45) Date of Patent: Jul. 14, 2020

(54) METHOD FOR TRANSMITTING DATA VIA SIDELINK AND TERMINAL

(71) Applicant: GUANGDONG OPPO MOBILE TELECOMMUNICATIONS CORP., LTD., Dongguan, Guangdong (CN)

(72) Inventor: Bin Feng, Dongguan (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 0 days.

(21) Appl. No.: 15/780,218

(22) PCT Filed: Jan. 29, 2016

(86) PCT No.: PCT/CN2016/072671
§ 371 (c)(1),
(2) Date: May 30, 2018

(87) PCT Pub. No.: WO2017/128275
PCT Pub. Date: Aug. 3, 2017

(65) Prior Publication Data
US 2018/0376525 A1 Dec. 27, 2018

(51) Int. Cl.
*H04W 76/14* (2018.01)
*H04W 72/04* (2009.01)
(Continued)

(52) U.S. Cl.
CPC .......... *H04W 76/14* (2018.02); *H04L 27/0014* (2013.01); *H04W 56/001* (2013.01);
(Continued)

(58) Field of Classification Search
CPC ..... H04W 76/11; H04W 76/14; H04W 72/02; H04W 72/04; H04W 72/04065;
(Continued)

(56) References Cited

U.S. PATENT DOCUMENTS

2013/0150061 A1 6/2013 Shin et al.
2014/0023008 A1 1/2014 Ahn
(Continued)

FOREIGN PATENT DOCUMENTS

CN 103002593 A 3/2013
CN 104954976 A 9/2015
(Continued)

OTHER PUBLICATIONS

International Search Report in international application No. PCT/CN2016/072671, dated Oct. 26, 2016.
(Continued)

*Primary Examiner* — Candal Elpenord
(74) *Attorney, Agent, or Firm* — Ladas & Parry LLP

(57) ABSTRACT

Provided in an embodiment of the present invention is a method for transmitting data via a sidelink. The method comprises: a scheduling terminal sends to a transmitting terminal a first physical control signal, wherein the first physical control signal comprises a first transmission resource used to transmit first-type system information; and the scheduling terminal sends to the transmitting terminal the first-type system information, wherein the first-type system information comprises sidelink resource pool information used for transmission via a sidelink between the transmitting terminal and a receiving terminal. In the embodiment of the present invention, a scheduling terminal can configure a sidelink transmission resource for a transmitting terminal, thereby significantly increasing success rates of D2D and V2V communication, reducing delay, and expanding the capacity of D2D and V2V communication.

18 Claims, 11 Drawing Sheets

(51) Int. Cl.
*H04W 76/11* (2018.01)
*H04L 27/00* (2006.01)
*H04W 72/12* (2009.01)
*H04W 56/00* (2009.01)

(52) U.S. Cl.
CPC ....... *H04W 72/04* (2013.01); *H04W 72/0406* (2013.01); *H04W 72/0453* (2013.01); *H04W 72/121* (2013.01); *H04W 76/11* (2018.02); *H04L 2027/0095* (2013.01)

(58) Field of Classification Search
CPC ........... H04W 72/0453; H04W 72/121; H04W 56/001; H04L 27/0014; H04L 2027/0095
See application file for complete search history.

(56) References Cited

U.S. PATENT DOCUMENTS

| | | | |
|---|---|---|---|
| 2015/0245193 A1* | 8/2015 | Xiong | H04W 4/80 370/328 |
| 2016/0066337 A1* | 3/2016 | Sartori | H04W 76/14 370/329 |
| 2016/0183239 A1 | 6/2016 | Lee et al. | |
| 2016/0183241 A1 | 6/2016 | Lee et al. | |
| 2016/0302249 A1* | 10/2016 | Sheng | H04W 4/70 |
| 2016/0338095 A1* | 11/2016 | Faurie | H04W 28/0278 |
| 2018/0263052 A1* | 9/2018 | Xu | H04W 72/04 |
| 2019/0191452 A1* | 6/2019 | Pelletier | H04W 72/1289 |

FOREIGN PATENT DOCUMENTS

| | | |
|---|---|---|
| JP | 2015050529 A | 3/2015 |
| WO | 2014048486 A1 | 4/2014 |
| WO | 2014050556 A1 | 4/2014 |
| WO | 2014173429 A1 | 10/2014 |
| WO | 2015020356 A1 | 2/2015 |
| WO | WO 2015020356 A1 | 2/2015 |
| WO | 2015122684 A1 | 8/2015 |
| WO | 2015169262 A2 | 11/2015 |
| WO | 2015170866 A1 | 11/2015 |

OTHER PUBLICATIONS

The Written Opinion of the International Search Authority in international application No. PCT/CN2016/072671, dated Oct. 26, 2016.
First Office Action of the Japanese application No. 2018-536155, dated Aug. 30, 2019.
Supplementary European Search Report in European application No. 16887162.2, dated May 29, 2019.
Ericsson: "On scheduling procedure for D2D", 3GPP Draft; R1-140778 on Scheduling Procedure for D2D, 3rd Generation Partnership Project (3GPP), Mobile Competence Centre ; 650, Route Des Lucioles; F-06921 Sophia-Antipolis Cedex; France, vol. RAN WG1, No. Prague, Czech Republic; Feb. 10, 2014-Feb. 14, 2014 Feb. 9, 2014 (Feb. 9, 2014), XP050736279.
Nokia et al: "D2D Communication without network coverage", 3GPP Draft; R1-134535, 3rd Generation Partnership Project (3GPP), Mobile Cempetence Centre; 650, Route Des Lucioles; F-06921 Sophia-Antipolis Cedex; France, vol. RAN WG1, No. Guangzhou, China; Oct. 7, 2013-Oct. 11, 2013 Sep. 28, 2013 (Sep. 28, 2013), XP050717638.
Kyocera: "Consideration of ProSe discovery in partial and outside network coverage", 3GPP Draft; R2-151531 Prose OOC and Pac Discovery, 3rd Generation Partnership Project (3GPP), Mobile Competence Centre; 650, Route Des Lucioles; F-06921 Sophia-Antipolis Cedex; France, vol. RAN WG2, No. Bratislava, Slovak; Apr. 20, 2015-Apr. 24, 2015 Apr. 11, 2015 (Apr. 11, 2015), XP050953335.

* cited by examiner

METHOD FOR TRANSMITTING DATA VIA SIDELINK AND TERMINAL

RELATED APPLICATION

This application is an application under 35 U.S.C. 371 of International Application No. PCT/CN2016/072671 filed on Jan. 29, 2016, the entire contents of which are incorporated herein by reference.

TECHNICAL FIELD

Embodiments of the disclosure relate to the field of communications, and more particularly to a method for data transmission via a sidelink and a terminal.

BACKGROUND

Device to Device (D2D) communication and Vehicle to X (V2X) Internet of vehicles communication have become hotspot fields for development of wireless communication technologies, where V2X includes Vehicle to Vehicle (V2V) communication, Vehicle to Infrastructure (V2I) communication, Vehicle to Pedestrian (V2P) communication and the like.

D2D communication may be applied to novel services such as a social network, shopping entertainment, rescue and relief and the like. In V2V communication, through wireless communication between multiple On Board Units (OBUs), sensing information of a vehicle-borne radar, a camera and the like (i.e., sensor sharing) may be shared between vehicles and thus sensing ranges of the vehicles are extended from a line-of-sight range of dozens of meters to a non-line-of-sight range of hundreds of meters, thereby greatly improving driving safety of the vehicles and effectively implementing aided driving and automatic driving. V2I communication is another communication mode of the V2X system, and is used for communication between an OBU and a Road Side Unit (RSU); the RSU is a device with a function of a V2X terminal, for example, an intelligent traffic light and a traffic billboard, and may provide intelligent traffic information for the OBU to improve traffic efficiency of a vehicle mounted with the OBU. In an existing V2X system, V2V and V2I adopt the same design in terms of wireless communication but transmit different services, and the two modes work autonomously.

A main technical challenge, with which D2D and V2V communication is confronted, is a problem about interference suppression and congestion control between multiple terminals. Particularly, a V2V system is required to support hundreds of vehicles to simultaneously transmit sensor sharing information within a range of hundreds of meters while keeping a very low delay and very high data transmission reliability, so that a V2V resource scheduling technology capable of effectively suppressing interference between the terminals is needed. An original Institute of Electrical and Electronics Engineers (IEEE) 802.11p V2V technology may only use a pure Ad Hoc networking and scheduling scheme, namely using a self-organization mechanism such as Listen-Before-Talk (LBT) for resource scheduling on the basis of distributed cooperation between D2D or OBU terminals, to avoid resource conflict. However, such a completely centerless scheduling scheme is lower in efficiency, and along with increase of the number of terminals, the communication delay may be gradually increased and the transmission success rate may also be gradually reduced.

The Long Term Evolution (LTE) V2X technology under research and standardization of the 3rd Generation Partnership Project (3GPP) may perform centralized scheduling on V2V terminals with a base station of an LTE cellular network to greatly improve V2V transmission efficiency, reduce the V2V transmission delay and increase the transmission success rate.

Such a scheduling technology combining centralized scheduling of the base station and self-organized scheduling of Ad Hoc has been adopted in a 3GPP Release 12 (R12) LTE D2D (based on communication between LTE terminals) standard, and thus a concept of sidelink is introduced besides an uplink and a downlink. The sidelink is a direct communication link between two terminals, and D2D communication is sidelink communication. The existing LTE V2X technology mainly uses the LTE D2D design as a reference, and also adopts a sidelink communication manner. FIG. 1 illustrates a schematic diagram of a deployment scenario of an existing V2V system.

There are usually three working scenarios for sidelink communication, i.e., In Coverage, Out of Coverage and Partial Coverage.

In the In Coverage scenario (i.e., a scenario with coverage of an LTE base station), the base station allocates a required sidelink resource to an OBU terminal at first, and then the terminal uses the resource allocated by the base station to transmit sidelink data and transmission parameters thereof.

In the Partial Coverage scenario (i.e., a scenario where the coverage of the LTE base station is unstable and signals are sporadic), the base station may not allocate the sidelink resource to the terminal dynamically and in real time, then the base station periodically broadcasts system information of a semi-static resource pool, and the OBU terminal may randomly select a sidelink resource from the resource pool to transmit the sidelink data and the transmission parameter thereof when getting out of the coverage as long as it receives information of the resource pool when being covered.

In the Out of Coverage scenario (i.e., a scenario completely without the coverage of the LTE base station), it is even impossible for the OBU terminal to occasionally receive the information of the resource pool in the system information of the base station. Under this condition, the sidelink data and the transmission parameter thereof may be transmitted only by randomly selecting a sidelink resource from a preconfigured resource pool statically stored in the terminal.

However, randomly selecting a sidelink resource from a resource pool to transmit sidelink data and transmission parameters thereof may inevitably bring resource conflict and interference between D2D/OBU terminals to cause reduction in the transmission success rate of the sidelink data. If the transmission success rate is increased by multiple retransmissions, the transmission delay may be increased. For achieving both of a high success rate and a low delay, the number of terminals transmitting sidelink signals at the same time within the same coverage is to be limited, which makes it difficult to implement high-capacity D2D communication and high-vehicle-flow V2V communication.

Therefore, for reducing interference between D2D/OBU terminals and improving sidelink communication efficiency, it is necessary to increase a proportion of an In Coverage scenario and reduce a proportion of an Out of Coverage scenario as much as possible. Coverage and capacity of a base station of a telecommunication operating company are planned according to a density distribution of terminals of a conventional type (for example, mobile phones), so that it is difficult to ensure that a D2D/OBU terminal is covered well. More seriously, if the telecommunication operating company is unwilling to perform base station upgrading and network optimization to support a D2D/V2V service in consideration of the cost, the D2D/OBU terminals may completely be in the Out of Coverage scenario, at this moment, LTE D2D and LTE V2V technologies may only adopt a resource pool random selection or LBT scheme, and their performance may also be unlikely to be higher than a pure Ad Hoc system such as IEEE 802.11p.

SUMMARY

The embodiments of the disclosure provide a method for data transmission via a sidelink, which can configure a sidelink transmission resource for a terminal out of coverage of a base station.

A first aspect provides a method for data transmission via a sidelink, which may include that: a scheduling terminal transmits first physical control signaling to a transmitting terminal, the first physical control signaling including a first transmission resource for transmitting first system information; and the scheduling terminal transmits the first system information to the transmitting terminal, the first system information including sidelink resource pool information.

A second aspect provides a method for data transmission via a sidelink, which may include that: a transmitting terminal receives indication information of a sidelink resource transmitted by a scheduling terminal; the transmitting terminal determines a first transmission resource and a transmission parameter for transmitting sidelink data according to the indication information of the sidelink resource; and the transmitting terminal transmits the sidelink data to a receiving terminal with the first transmission resource and the transmission parameter.

A third aspect provides a method for data transmission via a sidelink, which may include that: a receiving terminal receives physical control signaling transmitted by a transmitting terminal, the physical control signaling including a sidelink transmission resource and a transmission parameter; and the receiving terminal receives sidelink data transmitted by the transmitting terminal according to the sidelink transmission resource and the transmission parameter.

In combination with the third aspect, in an example, before the physical control signaling transmitted by the transmitting terminal is received, the method may further include receiving system information transmitted by the transmitting terminal, the system information including indication information about whether the transmitting terminal is in coverage of a base station, indication information about whether the transmitting terminal is in coverage of a scheduling terminal and a transmitting bandwidth of the transmitting terminal.

In combination with the third aspect, in another example, before that the physical control signaling transmitted by the transmitting terminal is received, the method may further include receiving a synchronization signal transmitted by the transmitting terminal, the synchronization signal including a transmitting clock of the transmitting terminal.

A fourth aspect provides a terminal, which may be a scheduling terminal for data transmission via a sidelink and include: a transmitting unit, configured to transmit first physical control signaling to a transmitting terminal, the first physical control signaling including a first transmission resource for transmitting first system information, wherein the transmitting unit may further be configured to transmit the first system information to the transmitting terminal, the first system information including sidelink resource pool information.

A fifth aspect provides a terminal, which may be a transmitting terminal for data transmission via a sidelink and include: a receiving unit, configured to receive indication information of a sidelink resource transmitted by a scheduling terminal; a processing unit, configured to determine a first transmission resource and a transmission parameter for transmitting sidelink data according to the indication information of the sidelink resource; and a transmitting unit, configured to transmit the sidelink data to a receiving terminal with the first transmission resource and the transmission parameter.

A sixth aspect provides a terminal, which may be a receiving terminal for data transmission via a sidelink and include: a receiving unit, configured to receive physical control signaling transmitted by a transmitting terminal, the physical control signaling including a sidelink transmission resource and a transmission parameter, wherein the receiving unit may further be configured to receive sidelink data transmitted by the transmitting terminal according to the sidelink transmission resource and the transmission parameter.

In the embodiments of the disclosure, the scheduling terminal may configure a sidelink transmission resource for the transmitting terminal, so that a D2D and V2V communication success rate may be remarkably increased, a delay may be reduced, and a D2D and V2V communication capacity may be expanded.

BRIEF DESCRIPTION OF DRAWINGS

In order to describe the technical solutions of the embodiments of the disclosure more clearly, the drawings required to be used in descriptions about the embodiments or a conventional art will be simply introduced below. Obviously, the drawings described below are only some embodiments of the disclosure. Other drawings may further be obtained by those of ordinary skilled in the art according to these drawings without creative work.

DETAILED DESCRIPTION

The technical solutions in the embodiments of the disclosure will be clearly and completely described below in combination with the drawings in the embodiments of the disclosure. Obviously, the described embodiments are not all embodiments but part of embodiments of the disclosure. All other embodiments obtained by those of ordinary skilled in the art on the basis of the embodiments in the disclosure without creative work shall fall within the scope of protection of the disclosure.

Figure 1:
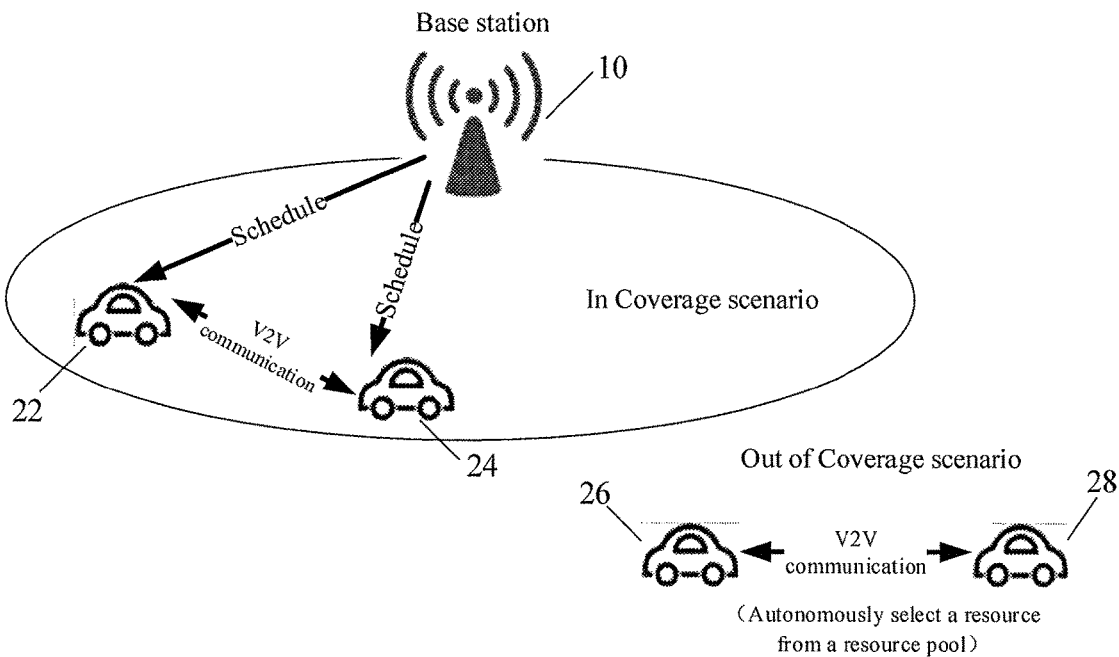
FIG. 1 illustrates a schematic diagram of a deployment scenario of an existing V2V system.

FIG. 1 illustrates a schematic diagram of a deployment scenario of an existing V2V system. In FIG. 1, a vehicle 22 and a vehicle 24 are located within the network coverage of a base station 10, that is, the vehicle 22 and the vehicle 24 may perform V2V communication on the basis of scheduling of the base station 10. A vehicle 26 and a vehicle 28 are located out of the network coverage of the base station 10, that is, the vehicle 26 and the vehicle 28 may randomly select a resource from a statically stored resource pool only.

However, it is also to be noted that the vehicle 22 and the vehicle 24 may also in a Partial Coverage scenario even though the vehicle 22 and vehicle 24 in FIG. 1 are spatially located within the network coverage of the base station 10, for example, the condition that the vehicle 22 and the vehicle 24 occasionally receive scheduling information of the base station 10 in terms of time may occur.

Figure 2:
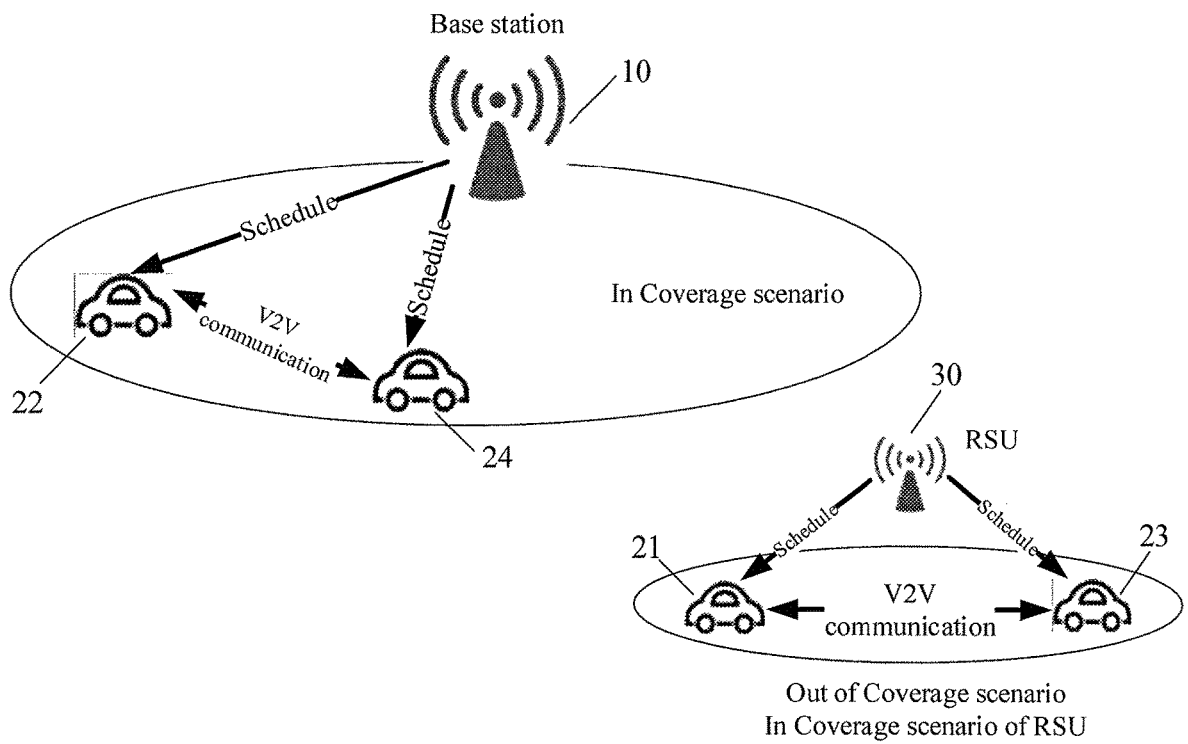
FIG. 2 illustrates a schematic diagram of a deployment scenario of a V2V system according to an embodiment of the disclosure.

FIG. 2 illustrates a schematic diagram of a deployment scenario of a V2V system according to an embodiment of the disclosure. In FIG. 2, a vehicle 21 and a vehicle 23 may communicate with an RSU 30. RSUs are always mounted at the side of roads, may form good coverage for vehicles to compensate for coverage blind areas of mobile base stations, require no return network, are independent of a telecommunication operating company, and may be densely deployed by the traffic control department with low cost.

It can be understood that, in the embodiment, communication between the vehicle 21/vehicle 23 and the RSU 30 specifically means communication between an OBU in the vehicle 21/vehicle 23 and the RSU 30.

In the embodiment of the disclosure, the RSU has a function of receiving and transmitting V2X signals and a function of being scheduled by base stations, and further has a function of scheduling OBUs. When an OBU terminal is in an Out of Coverage scenario, the RSU may take the place of the base station, and convert a manner of randomly selecting a sidelink resource in a static/semi-static resource pool into a sidelink resource scheduling manner, thus converting the Out of Coverage scenario of the base station into an In Coverage scenario of the RSU.

It can be understood that description about the V2V system shown in FIG. 2 may also be similarly popularized to D2D communication in a D2D system, that is, additional D2D terminals with a scheduling function may be deployed to implement more effective sidelink resource scheduling.

For example, in the case that a user wears multiple pieces of wearable equipment, a mobile phone of the user may not only be used as a personal gateway for data uploading of a smartwatch, a band and various wearable sensors but also schedule sidelink resources of these wearable equipment.

Figure 3:
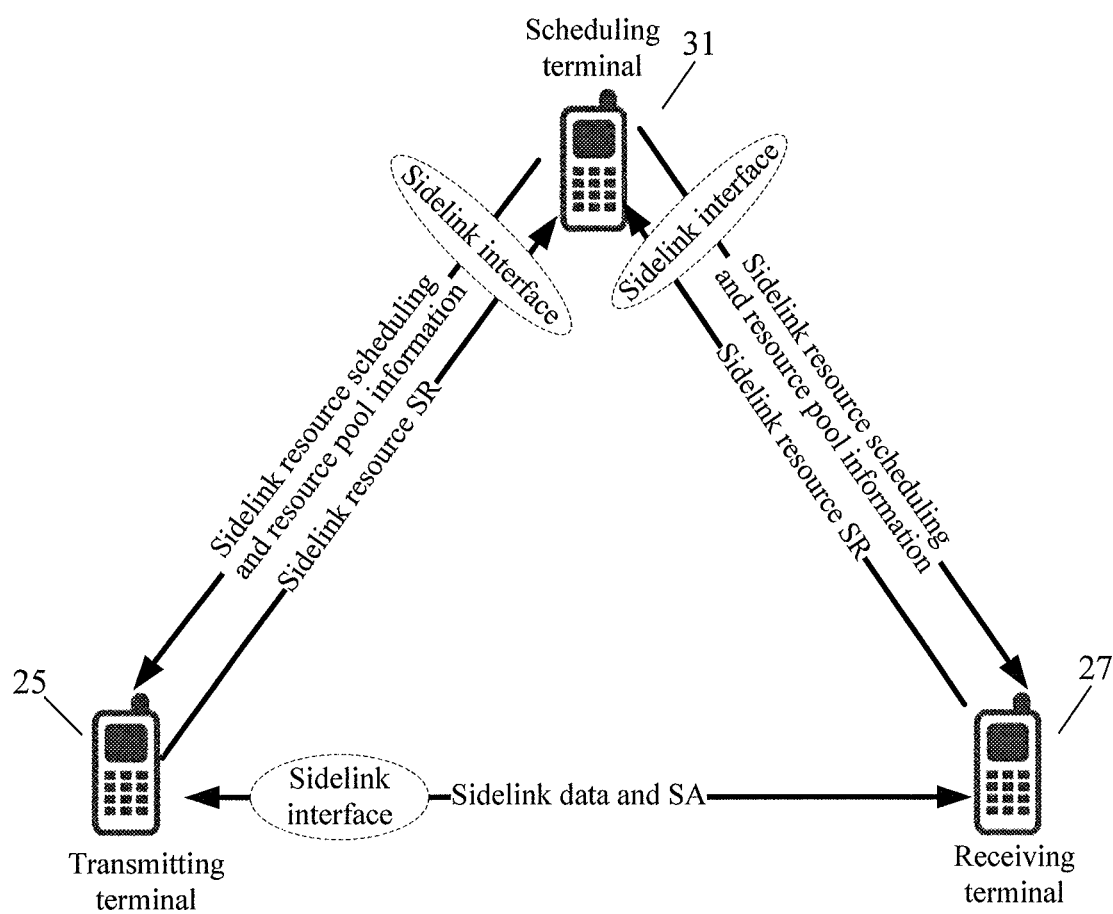
FIG. 3 illustrates a schematic diagram of a system architecture according to an embodiment of the disclosure.

FIG. 3 illustrates a schematic diagram of a system architecture according to an embodiment of the disclosure. The system shown in FIG. 3 includes a scheduling terminal 31, a transmitting terminal 25 and a receiving terminal 27. Moreover, the scheduling terminal 31, the transmitting terminal 25 and the receiving terminal 27 communicate with each other through sidelink interfaces.

It can be understood that, in the embodiment of the disclosure, the transmitting terminal 25 and the receiving terminal 27 may perform D2D communication or V2V communication. Moreover, transmitting and receiving in the transmitting terminal 25 and the receiving terminal 27 are relative concepts (i.e., can be interchanged with each other).

In the embodiment of the disclosure, the transmitting terminal 25 and the receiving terminal 27 may be referred to as type-1 terminals, and the scheduling terminal 31 may be referred to as a type-2 terminal. The type-1 terminals may perform D2D communication or V2V communication, and the type-2 terminal schedules a resource for transmission between the type-1 terminals. It is to be noted that the scheduling terminal 31 is also a relative concept. If a certain mobile phone is the scheduling terminal 31 (i.e., the type-2 terminal) in the system shown in FIG. 3, it is configured to perform resource scheduling for the type-1 terminals. However, in another scenario, the mobile phone may require another scheduling terminal to schedule a resource for it, that is, in the other scenario, the mobile phone may be a transmitting terminal or a receiving terminal (i.e. a type-1 terminal). Descriptions will be made in subsequent embodiments of the disclosure mainly for the scenario shown in FIG. 3.

A type-1 terminal may initiate a sidelink resource scheduling request (SR) to a type-2 terminal and receive sidelink resource scheduling grant information and sidelink resource pool information from the type-2 terminal. Then, the type-1 terminal may transmit sidelink data and a Scheduling Assignment (SA) to another type-1 terminal.

The type-2 terminal may receive the sidelink resource SR from the type-1 terminal, schedule a sidelink resource for the type-1 terminal and transmit the corresponding sidelink resource scheduling grant information to the type-1 terminal. The type-2 terminal may also divide the sidelink resource pool information and transmit the sidelink resource pool information to the type-1 terminal.

Alternatively, the type-1 terminal may be an OBU and the type-2 terminal may be an RSU. Alternatively, the type-1 terminal may be wearable equipment and the type-2 terminal may be a mobile phone of a user.

It is to be noted that the type-1 terminal and type-2 terminal in the embodiment of the disclosure may be integrated into a physical entity. For example, a certain terminal A may have a function of the type-1 terminal and also has a function of the type-2 terminal. At this moment, the sidelink interface between the type-1 terminal and type-2 terminal shown in FIG. 3 may be an internal interface of the terminal A. For example, as a personal gateway of wearable equipment and a sidelink scheduling node, a mobile phone includes a transmission module for transmitting sidelink data with each piece of wearable equipment and a scheduling module for scheduling the wearable equipment. Here, the transmission module is equivalent to a type-1 terminal and the scheduling module is equivalent to a type-2 terminal. The two modules are not connected through a sidelink interface but connected through an internal software/hardware interface of the mobile phone. Therefore, it is to be understood that the sidelink interface shown in FIG. 3 is a general description and further includes an internal interface under this condition.

Figure 4:
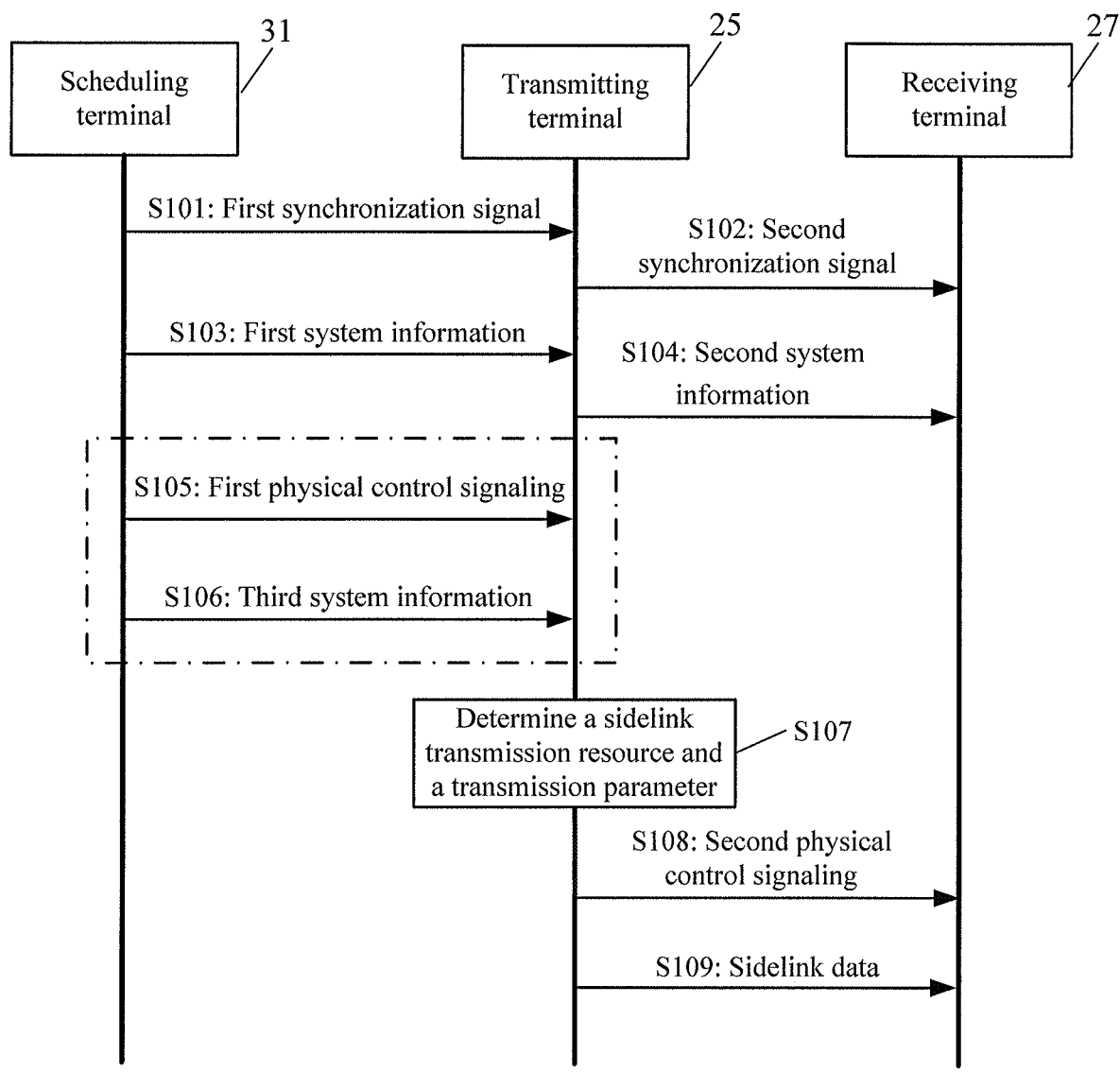
FIG. 4 illustrates a schematic flowchart of a wireless resource scheduling method according to an embodiment of the disclosure.

FIG. 4 illustrates a schematic flowchart of a wireless resource scheduling method according to an embodiment of the disclosure. The method shown in FIG. 4 includes the following operations.

In S101, a scheduling terminal 31 transmits a first synchronization signal to a transmitting terminal 25.

Alternatively, the scheduling terminal 31 may transmit the first synchronization signal in a broadcast form, and in such a manner, all of type-1 terminals capable of communicating with the scheduling terminal 31 through a sidelink may receive the first synchronization signal.

Here, the first synchronization signal may include a transmitting clock of the scheduling terminal 31, and may further include an Identity (ID) of the scheduling terminal 31.

Correspondingly, after receiving the first synchronization signal, the transmitting terminal 25 may obtain the transmitting clock of the scheduling terminal 31, and meanwhile, may identify the ID of the scheduling terminal 31 according to the ID of the scheduling terminal 31.

Therefore, the transmitting terminal 25 and the scheduling terminal 31 may complete synchronization on the basis of the first synchronization signal. A synchronization process may be learnt from descriptions about the synchronization process in the conventional art and will not be elaborated in the embodiment of the disclosure.

In S102, the transmitting terminal 25 transmits a second synchronization signal to a receiving terminal 27.

Alternatively, the transmitting terminal 25 may transmit the second synchronization signal in the broadcast form, and in such a manner, all of the other type-1 terminals capable of communicating with the transmitting terminal 25 through the sidelink may receive the second synchronization signal.

Here, the second synchronization signal may include a transmitting clock of the transmitting terminal 25.

Correspondingly, after receiving the second synchronization signal, the receiving terminal 27 may obtain the transmitting clock of the transmitting terminal 25.

Therefore, the receiving terminal 27 and the transmitting terminal 25 may complete synchronization on the basis of the second synchronization signal. A synchronization process may be learnt from the descriptions about the synchronization process in the conventional art and will not be elaborated in the embodiment of the disclosure.

In S103, the scheduling terminal 31 transmits first system information to the transmitting terminal 25.

Alternatively, the scheduling terminal 31 may transmit the first system information in the broadcast form, and in such a manner, all of the type-1 terminals capable of communicating with the scheduling terminal 31 through the sidelink may receive the first system information.

Here, the first system information may include: indication information about whether the scheduling terminal 31 is in coverage of a base station, a system configuration parameter of the scheduling terminal 31, and first transmission resource configuration information.

Here, indication information about whether the scheduling terminal 31 is in the coverage of the base station may include information indicating that the scheduling terminal 31 is In Coverage or Out of Coverage and the like.

Here, the system configuration parameter of the scheduling terminal 31 may include information of a transmitting bandwidth of the scheduling terminal 31, a multi-antenna configuration of the scheduling terminal 31 and the like.

Here, the first transmission resource configuration information may be transmission resource configuration information for first physical control signaling to be transmitted.

In S104, the transmitting terminal 25 transmits second system information to the receiving terminal 27.

Alternatively, the transmitting terminal 25 may transmit the second system information in the broadcast form, and in such a manner, all of the other type-1 terminals capable of communicating with the transmitting terminal 25 through the sidelink may receive the second system information.

Here, the second system information may include: indication information about whether the transmitting terminal 25 is in the coverage of the base station, indication information about whether the transmitting terminal 25 is in coverage of the scheduling terminal 31, and a transmitting bandwidth of the transmitting terminal 25.

In S105, the scheduling terminal 31 transmits first physical control signaling to the transmitting terminal 25.

Alternatively, the scheduling terminal 31 may transmit the first physical control signaling in the broadcast form, and in such a manner, all of the type-1 terminals capable of communicating with the scheduling terminal 31 through the sidelink may receive the first physical control signaling.

Here, the scheduling terminal 31 may transmit the first physical control signaling with a first transmission resource. Or, in other words, the scheduling terminal 31 transmits the first physical control signaling on the first transmission resource.

Specifically, in S105, the transmitting terminal 25 receives the first physical control signaling according to the first transmission resource configuration information received in S103. Or, in other words, the transmitting terminal 25 receives the first physical control signaling on the first transmission resource.

Here, the first physical control signaling includes second transmission resource configuration information.

Here, the second transmission resource configuration information may be transmission resource configuration information for third system information to be transmitted.

In S106, the scheduling terminal 31 transmits third system information to the transmitting terminal 25.

Alternatively, the scheduling terminal 31 may transmit the third system information in the broadcast form, and in such a manner, all of the type-1 terminals capable of communicating with the scheduling terminal 31 through the sidelink may receive the third system information.

Here, the scheduling terminal 31 may transmit the third system information with a second transmission resource. Or, in other words, the scheduling terminal 31 transmits the third system information on the second transmission resource.

Specifically, in S106, the transmitting terminal 25 receives the third system information according to the second transmission resource configuration information received in S105. Or, in other words, the transmitting terminal 25 receives the third system information on the second transmission resource.

Here, the third system information may include sidelink resource pool information.

Here, a sidelink resource pool is configured by the scheduling terminal 31 for sidelink data transmission between the type-1 terminals (the transmitting terminal 25 and the receiving terminal 27).

Alternatively, as an embodiment, the first transmission resource configuration information included in the first system information in S103 may be transmission resource configuration information for the third system information to be transmitted. At this moment, S105 in FIG. 4 may not be executed, and moreover, at this moment, in S106, the transmitting terminal 25 receives the third system information according to the first transmission resource configuration information received in S103.

In S107, the transmitting terminal 25 determines a sidelink transmission resource and transmission parameter for transmitting sidelink data.

Specifically, the transmitting terminal 25 selects the sidelink transmission resource from the sidelink resource pool received in S106.

As an embodiment, the transmitting terminal 25 may autonomously select the sidelink transmission resource for subsequently transmitting the sidelink data from the sidelink resource pool and determine the transmission parameter for subsequently transmitting the sidelink data.

For example, one resource in an idle state may be randomly selected from resources in the idle state in the sidelink resource pool as the sidelink transmission resource.

Here, the transmission parameter may also be referred to as a transmission format, and may include modulation and coding schemes such as a modulation order, a code rate and the like.

In S108, the transmitting terminal 25 transmits second physical control signaling to the receiving terminal 27.

Here, the second physical control signaling may include the sidelink transmission resource and the transmission parameter.

Alternatively, the transmitting terminal 25 may transmit the second physical control signaling with a predefined transmitting resource.

In S109, the transmitting terminal 25 transmits the sidelink data to the receiving terminal 27.

Specifically, the transmitting terminal 25 transmits the sidelink data to the receiving terminal 27 with the sidelink transmission resource and transmission parameter determined in S107.

Correspondingly, the receiving terminal 27 receives the sidelink data transmitted by the transmitting terminal 25 according to the sidelink transmission resource and transmission parameter received in S108. Or, in other words, the receiving terminal 27 receives the sidelink data on the sidelink transmission resource on the basis of the transmission parameter.

Therefore, in the embodiment of the disclosure, a series of signals, information and channels are added in the sidelink to support sidelink resource scheduling of a terminal (the scheduling terminal 31) over other terminals (the transmitting terminal 25 and the receiving terminal 27). Furthermore, sidelink communication processes of synchronization, resource scheduling and the like are added on the basis of these added signals, information and channels.

The type-1 terminals (the transmitting terminal 25 and the receiving terminal 27) out of the coverage of the base station are converted into the type-2 terminal (the scheduling terminal 31) in the In Coverage scenario. For example, a sidelink resource scheduling function may be added to an RSU, so that in an Out of Coverage scenario, the RSU may take the place of the base station and convert a manner of randomly selecting a sidelink resource from a static/semi-static resource pool into a sidelink resource scheduling manner (as shown in FIG. 2). Therefore, sidelink resource conflict brought by random transmission resource selection and interference between OBU terminals may be maximally avoided, a D2D and V2V communication success rate may be remarkably increased, a delay may be reduced, and a D2D and V2V communication capacity may be expanded.

It can be understood that a communication flow that the transmitting terminal 25 autonomously selects the sidelink resource from the resource pool on the basis of the scheduling terminal 31 in FIG. 4 may be applied when the transmitting terminal 25 is in a Partial Coverage scenario of the scheduling terminal 31, or may be applied a scenario where the transmitting terminal 25 does not expect the scheduling terminal 31 to allocate the sidelink transmission resource even though the transmitting terminal 25 is in coverage of the scheduling terminal 31.

In addition, it can be understood that, in a scenario where the scheduling terminal 31 and the transmitting terminal 25 are integrated into a physical entity (for example, a terminal), the sidelink communication flow between the scheduling terminal 31 and the transmitting terminal 25 may be replaced with an internal communication flow of the physical entity (for example, the terminal) and the communication flow in FIG. 4 still applies.

It is to be noted that sequence numbers of the flow in FIG. 4 do not always represent an execution sequence of the flow. For example, S101 and S102 may be executed at the same time, or, S103, S105 and S106 may be executed before S102. A specific execution sequence is reflected by a logical relationship between each operation.

Figure 5:
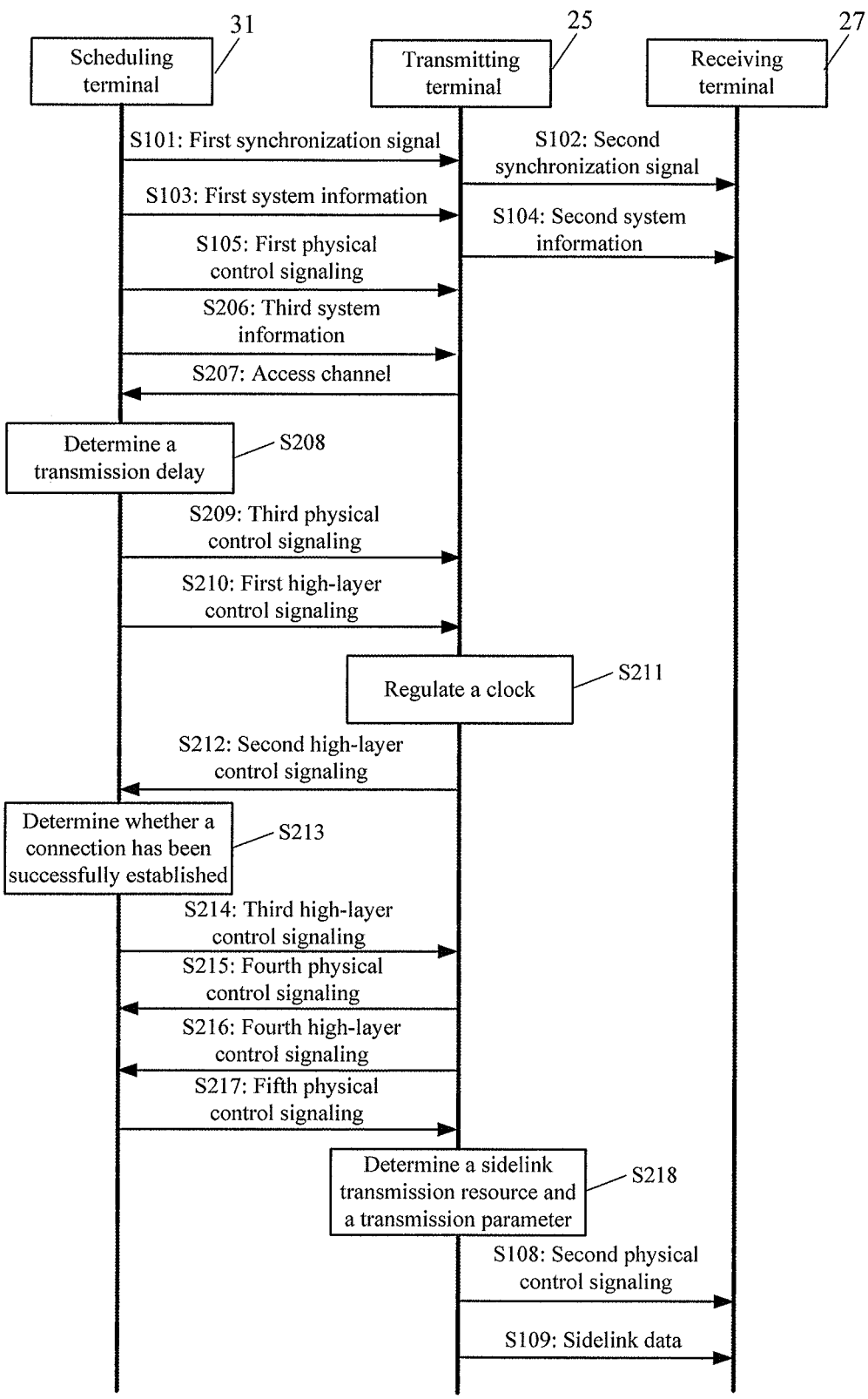
FIG. 5 illustrates another schematic flowchart of a wireless resource scheduling method according to an embodiment of the disclosure.

FIG. 5 illustrates another schematic flowchart of a wireless resource scheduling method according to an embodiment of the disclosure. The method shown in FIG. 5 includes the following operations.

In S101, a scheduling terminal 31 transmits a first synchronization signal to a transmitting terminal 25.

In S102, the transmitting terminal 25 transmits a second synchronization signal to a receiving terminal 27.

In S103, the scheduling terminal 31 transmits first system information to the transmitting terminal 25.

In S104, the transmitting terminal 25 transmits second system information to the receiving terminal 27.

In S105, the scheduling terminal 31 transmits first physical control signaling to the transmitting terminal 25.

The first physical control signaling includes second transmission resource configuration information.

Here, the second transmission resource configuration information may be transmission resource configuration information for third system information to be transmitted.

Operations S101 to S105 in FIG. 5 may be seen from descriptions about the operations with the same requirements in FIG. 4 and will not be elaborated herein to avoid repetitions.

Similar to the descriptions in FIG. 4, if first transmission resource configuration information included in the first system information in S103 is the transmission resource configuration information for the third system information to be transmitted, S105 may not be executed.

In S206, the scheduling terminal 31 transmits third system information to the transmitting terminal 25.

Alternatively, the scheduling terminal 31 may transmit the third system information in a broadcast form, and in such a manner, all of type-1 terminals capable of communicating with the scheduling terminal 31 through a sidelink may receive the third system information.

The scheduling terminal 31 may transmit the third system information with a second transmission resource. Or, in other words, the scheduling terminal 31 transmits the third system information on the second transmission resource.

Specifically, in S206, the transmitting terminal 25 receives the third system information according to the second transmission resource configuration information received in S105. Or, in other words, the transmitting terminal 25 receives the third system information on the second transmission resource.

If the first transmission resource configuration information included in the first system information in S103 may be the transmission resource configuration information for the third system information to be transmitted, that is, S105 is not executed, then in S206, the transmitting terminal 25 receives the third system information according to the first transmission resource configuration information received in S103.

The third system information may include resource configuration information of an access channel of the scheduling terminal 31.

Here, the resource configuration information of the access channel may be a transmission resource for the transmitting terminal 25 to transmit access preamble information.

In S207, the transmitting terminal 25 transmits an access channel to the scheduling terminal 31.

Specifically, the transmitting terminal 25 transmits the access channel according to the resource configuration information, received in S206, of the access channel. That is, the transmitting terminal 25 transmits the access channel with a resource of the access channel.

The access channel may include an access preamble signal.

In S208, the scheduling terminal 31 determines a transmission delay.

Specifically, the scheduling terminal 31 estimates the transmission delay between the transmitting terminal 25 and the scheduling terminal 31 according to the access preamble signal received in S207.

In S209, the scheduling terminal 31 transmits third physical control signaling to the transmitting terminal 25.

The third physical control signaling may include feedback resource configuration information.

Specifically, the feedback resource configuration information is resource configuration information of a feedback for the access preamble signal in S207.

Alternatively, as an embodiment, the first physical control signaling and third physical control signaling of the embodiment of the disclosure may be transmitted on the same physical channel.

In S210, the scheduling terminal 31 transmits first high-layer control signaling to the transmitting terminal 25.

The first high-layer control signaling may include feedback information for the access preamble signal in S207, and the feedback information may include a transmitting clock regulation instruction for the transmitting terminal 25 and third transmission resource configuration information.

Here, the third transmission resource configuration information is transmission resource configuration information allocated by the scheduling terminal 31 and for the transmitting terminal 25 to report a terminal ID.

The scheduling terminal 31 may transmit the first high-layer control signaling with a feedback resource included in the third physical control signaling. Or, in other words, the scheduling terminal 31 transmits the first high-layer control signaling on the feedback resource. Correspondingly, the transmitting terminal 25 may receive the first high-layer control signaling on the feedback resource.

Specifically, in S210, the transmitting terminal 25 receives the first high-layer control signaling according to the feedback resource configuration information received in S209.

In S211, the transmitting terminal 25 regulates a clock.

The transmitting terminal 25 regulates a local clock of the transmitting terminal 25 according to the clock regulation instruction included in the first high-layer control signaling, specifically regulates a transmitting clock to the scheduling terminal 31 and updates a synchronization state with the scheduling terminal 31.

In S212, the transmitting terminal 25 transmits second high-layer control signaling to the scheduling terminal 31.

The second high-layer control signaling includes the terminal ID of the transmitting terminal 25.

Specifically, the transmitting terminal 25 reports its own terminal ID to the scheduling terminal 31 according to the third transmission resource configuration information in the first high-layer control signaling. Or, in other words, the transmitting terminal 25 transmits the second high-layer control signaling to the scheduling terminal 31 with a third transmission resource.

Correspondingly, the scheduling terminal 31 may receive the second high-layer control signaling on the third transmission resource.

In S213, the scheduling terminal 31 determines whether the transmitting terminal 25 has successfully established a connection with the scheduling terminal 31 or not.

Specifically, the scheduling terminal 31 determines whether the transmitting terminal 25 has successfully established the connection with it or not according to the terminal ID of the transmitting terminal 25 in S212.

In S214, the scheduling terminal 31 transmits third high-layer control signaling to the transmitting terminal 25.

Alternatively, as an embodiment, if it is determined in S213 that the transmitting terminal 25 has yet not successfully established the connection with the scheduling terminal 31, the third high-layer control signaling does not include the ID of the transmitting terminal 25.

Correspondingly, it can be understood that, if in S214, the transmitting terminal 25 finds by parsing and the like that the third high-layer control signaling does not include ID of the transmitting terminal 25 after receiving the third high-layer control signaling, the transmitting terminal 25 executes S207 after S214, namely retransmitting the access channel to the scheduling terminal 31.

Alternatively, as another embodiment, if it is determined in S213 that the transmitting terminal 25 has successfully established the connection with the scheduling terminal 31, the third high-layer control signaling includes the ID of the transmitting terminal 25, and meanwhile, the third high-layer control signaling may further include fourth transmission resource configuration information.

Here, the fourth transmission resource configuration information is used for the transmitting terminal 25 to report a sidelink resource SR.

Correspondingly, it can be understood that if in S214, the transmitting terminal 25 finds by parsing and the like that the third high-layer control signaling includes ID of the transmitting terminal 25 after receiving the third high-layer control signaling, that is, the transmitting terminal 25 finds its own ID in the third high-layer control signaling, the transmitting terminal 25 executes S215 after S214.

Alternatively, as an embodiment, the first high-layer control signaling and third high-layer control signaling of the embodiment of the disclosure may be transmitted on the same control channel.

In S215, the transmitting terminal 25 transmits fourth physical control signaling to the scheduling terminal 31.

Specifically, the third high-layer control signaling received in S214 by the transmitting terminal 25 includes its own ID, and then the transmitting terminal 25 may determine that the connection has been successfully established with the scheduling terminal 31 and transmits the fourth physical control signaling.

The transmitting terminal 25 may transmit the fourth physical control signaling with a fourth transmission resource.

The fourth physical control signaling includes the sidelink resource SR.

In S216, the transmitting terminal 25 transmits fourth high-layer control signaling to the scheduling terminal 31.

The fourth high-layer control signaling includes a sidelink buffer status report (BSR) of the transmitting terminal 25.

Alternatively, in the embodiment of the disclosure, the second high-layer control signaling and the fourth high-layer control signaling may be transmitted on the same control channel.

In S217, the scheduling terminal 31 transmits fifth physical control signaling to the transmitting terminal 25.

The fifth physical control signaling may include sidelink resource scheduling grant information.

Here, the scheduling terminal 31 executes S217 after receiving the sidelink resource SR of the transmitting terminal 25. Specifically, the sidelink resource scheduling grant information is configured by the scheduling terminal 31 for sidelink data transmission between the type-1 terminals (the transmitting terminal 25 and the receiving terminal 27).

Alternatively, in the embodiment of the disclosure, the second high-layer control signaling and the fourth high-layer control signaling may be transmitted on the same control channel.

Alternatively, in the embodiment of the disclosure, the first physical control signaling, the third physical control signaling and the fifth physical control signaling may be transmitted on the same physical control channel.

In S218, the transmitting terminal 25 determines a sidelink transmission resource and a transmission parameter for transmitting sidelink data.

Specifically, the transmitting terminal 25 determines the sidelink transmission resource and the transmission parameter according to the sidelink resource scheduling grant information.

In S108, the transmitting terminal 25 transmits second physical control signaling to the receiving terminal 27.

In S109, the transmitting terminal 25 transmits the sidelink data to the receiving terminal 27.

Operations S108 to S109 in FIG. 5 may be seen from descriptions about the operations with the same requirements in FIG. 4 and will not be elaborated herein to avoid repetitions.

It is to be noted that, even for the embodiment in FIG. 5, the scheduling terminal 31 may also regularly or periodically transmit sidelink resource pool information to the transmitting terminal 25. Therefore, even though the transmitting terminal 25 may not communicate with the scheduling terminal 31 or the transmitting terminal 25 does not expect the scheduling terminal 31 to allocate the resource at a certain subsequent time, the transmitting terminal 25 may further select the sidelink transmission resource from the sidelink resource pool information which has been received before, that is, the transmitting terminal 25 may further execute S107 to S109 in FIG. 4 at a certain time or under a certain condition after the method shown in FIG. 5.

Therefore, in the embodiment of the disclosure, a series of signals, information and channels are added in the sidelink to support sidelink resource scheduling of a terminal (the scheduling terminal 31) over other terminals (the transmitting terminal 25 and the receiving terminal 27). Furthermore, sidelink communication processes such as synchronization, resource scheduling and the like are added on the basis of these added signals, information and channels.

The type-1 terminals (the transmitting terminal 25 and the receiving terminal 27) out of coverage of a base station are converted to be an In Coverage scenario of the type-2 terminal (the scheduling terminal 31). For example, a sidelink resource scheduling function may be added to an RSU, so that in an Out of Coverage scenario, the RSU may take the place of the base station and convert a manner of randomly selecting a sidelink resource from a static/semi-static resource pool into a sidelink resource scheduling manner (as shown in FIG. 2). Therefore, sidelink resource conflict brought by random transmission resource selection and interference between OBU terminals may be maximally avoided, a D2D and V2V communication success rate may be remarkably increased, a delay may be reduced, and a D2D and V2V communication capacity may be expanded.

It can be understood that a communication flow that the transmitting terminal 25 autonomously selects the sidelink resource from the resource pool on the basis of the scheduling terminal 31 in FIG. 5 may be applied when the transmitting terminal 25 is in the In Coverage scenario of the scheduling terminal 31, and the transmitting terminal 25 may implement a real-time access process with the scheduling terminal 31, i.e., S207 to S214 in FIG. 5.

In addition, it can be understood that, in a scenario where the scheduling terminal 31 and the transmitting terminal 25 are integrated into a physical entity (for example, a terminal), the sidelink communication flow between the scheduling terminal 31 and the transmitting terminal 25 may be replaced with an internal communication flow of the physical entity (for example, the terminal) and the communication flow in FIG. 5 still applies.

On the basis of the descriptions about the flows of the embodiments of the disclosure in FIG. 4 and FIG. 5, it can be seen that, for D2D and V2V communication in Partial Coverage and Out of Coverage of a base station, the sidelink communication method of the disclosure may achieve significantly better effects compared with the existing method. For D2D and V2V communication in the In coverage scenario, the sidelink communication method of the disclosure may also achieve potential better effects compared with the existing method.

In existing Partial Coverage and Out of Coverage scenarios, a base station may not dynamically schedule sidelink transmission resources of D2D terminals or OBU terminals, the D2D terminals or the OBU terminals may randomly select transmission resources from a sidelink resource pool broadcast by the base station through system information or a preconfigured resource pool only, and conflict inevitably occurs between the resources selected by the D2D terminals or the OBU terminals, thereby causing inter-terminal interference. Adverse impact of reduction in a transmission success rate, increase of a transmission delay and the like brought by increase of the number of terminals in the same range (particularly a V2V system requires hundreds of vehicles transmit signals in the same area at the same time) makes it difficult for performance and reliability of the V2V system to meet a requirement on improvement of traffic safety and also greatly reduces communication reliability of the D2D/V2V system.

A type-2 terminal (which may be a novel RSU for V2V communication and may be a D2D terminal with a scheduling function for D2D communication) proposed in the embodiment of the disclosure may take the place of the base station in the Out of Coverage and Partial Coverage scenarios, and dynamically schedule a sidelink transmission resource of a D2D terminal or an OBU terminal, thereby avoiding inter-terminal interference, increasing the transmission success rate, reducing the transmission delay and ensuring the performance and reliability of the D2D/V2V system.

Participation of the type-2 terminal in the embodiment of the disclosure in sidelink wireless resource scheduling specifically has the following advantages. (1) Type-2 terminals may deploy more densely and more flexibly to form better coverage to D2D and V2V terminals. For example, RSUs and the like are usually deployed at the side of roads and close to communication vehicles, and may effectively cover areas with poor signals of base stations or out of coverage of the base stations, thereby reducing Out of Coverage areas. (2) Network planning of a cellular communication base station is not directed to D2D communication or the Internet of vehicles and may not be suitable for dense distribution of D2D terminals, road networks and vehicle flows (for example, a busy highway may be deployed in a suburb with sparse coverage of base stations), and type-2 terminals such as RSUs are not required to be connected through a wired network, may be flexibly deployed, are also much lower than the base stations in cost, may be better adapted to topology of roads and vehicle flows than the base stations and emphatically cover a dense vehicle flow scenario. In a wearable equipment scenario, even though a mobile phone is out of an area covered by an operating company, the mobile phone may autonomously perform scheduling on communication between wearable equipment of a user and between the wearable equipment and the mobile phone. (3) In an area with sparse base stations, coverage of a type-2 terminal is obviously smaller than coverage of a base station, coverage areas of multiple type-2 terminals may be formed in the coverage of the base station, and space-frequency multiplexing is adopted. However, it is difficult for the base station to distinguish the coverage areas of these type-2 terminals and unified scheduling may only be performed, so that space-domain resources are wasted. Coverage of a type-2 terminal is close to coverage of a D2D/OBU terminal, and multiple type-2 terminals may be deployed in coverage of the base station to form multiple frequency multiplexing areas, so that higher spectral efficiency may be achieved by more detailed frequency multiplexing. In the wearable equipment scenario, a large number of wearable equipment clusters are included in the coverage of the base station, and multiple wearable equipment clusters may multiplex the same frequency resource under sidelink scheduling of the mobile phone used as a cluster head. (4) A type-2 terminal of the disclosure works completely on a sidelink carrier, only occupies a few sidelink spectrum resources, may implement centralized-scheduling-based D2D/V2V communication on a segment of spectrum, and is not required to occupy additional spectrum resources of uplink and downlink carriers like a base station, so that spectrum resources are greatly saved, and difficulties in spectrum allocation are reduced. Even in an In Coverage scenario of the base station, scheduling of the type-2 terminal on a sidelink also effectively shares scheduling tasks of the base station on a Uu interface, reduces network loads of a Physical Downlink Control Channel (PDCCH) and Physical Uplink Control Channel (PUCCH) of a cellular network, and may reserve more control channel resources for a cellular mobile communication service. (5) In an area and country where a telecommunication operating company deploys no D2D/V2V network coverage, a third-party operating mechanism may deploy type-2 terminals (for example, RSUs deployed by the traffic control department) to schedule a D2D/V2V network instead of the telecommunication operating company.

In the embodiment of the disclosure, a series of signals, information and signaling are added in the sidelink, and these signals, information and signaling may multiplex the same resources on time-frequency resources.

Figure 6:
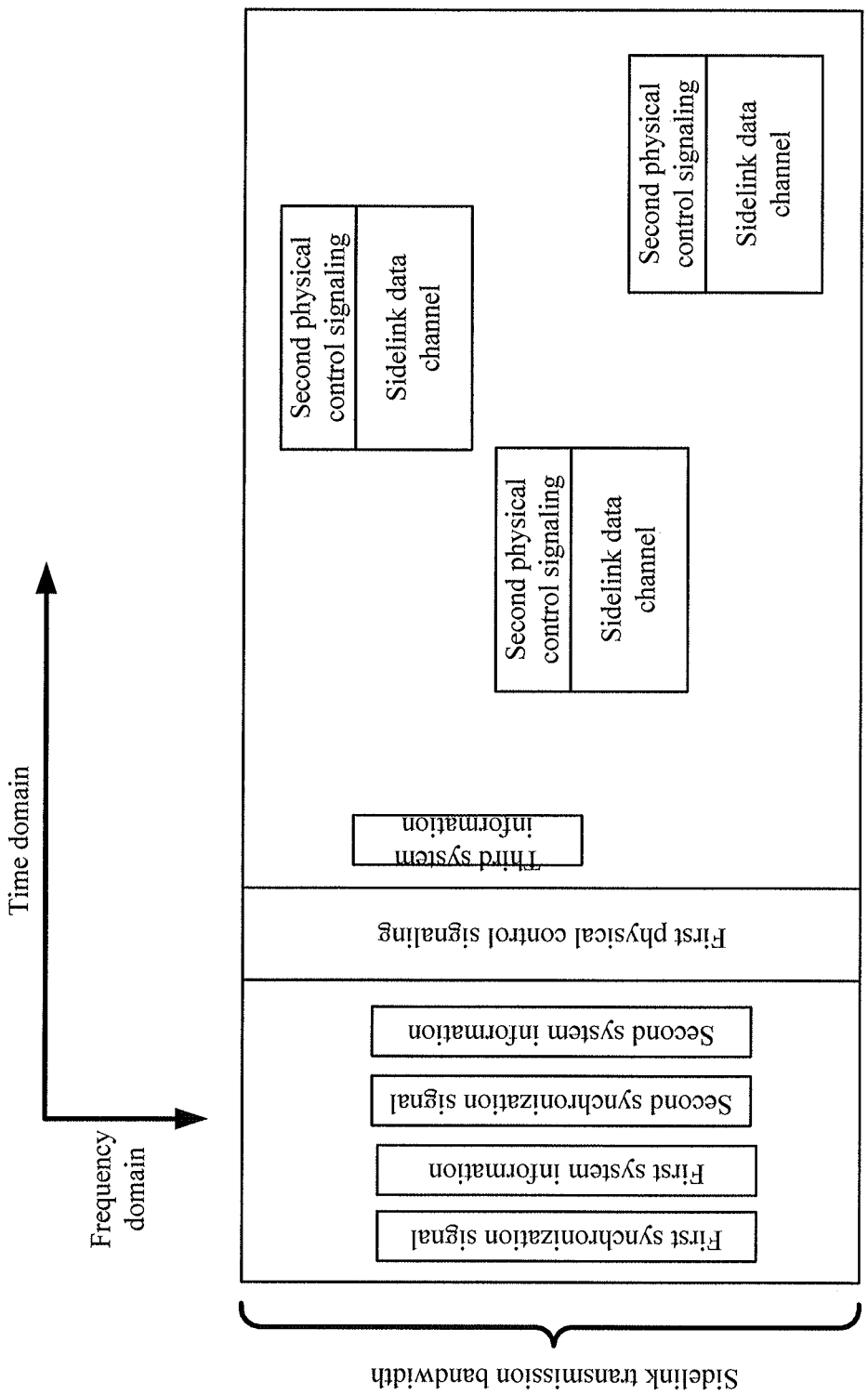
FIG. 6 and FIG. 7 illustrate schematic diagrams of time and frequency resources occupied for the embodiment shown in FIG. 4.
Figure 7:
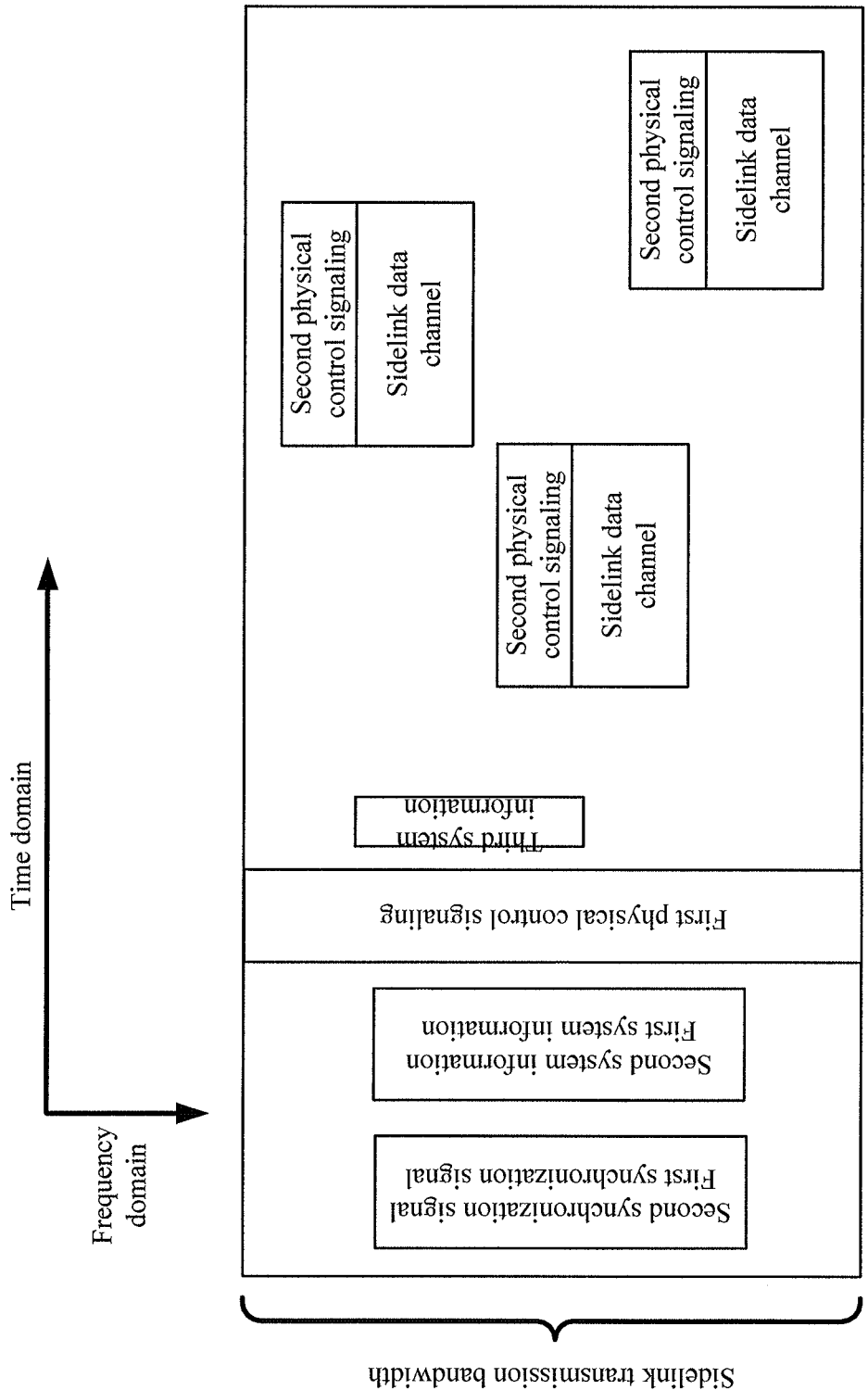

FIG. 6 and FIG. 7 illustrate schematic diagrams of time and frequency resources occupied by signals, information, signaling and the like in FIG. 4 respectively.

Figure 8:
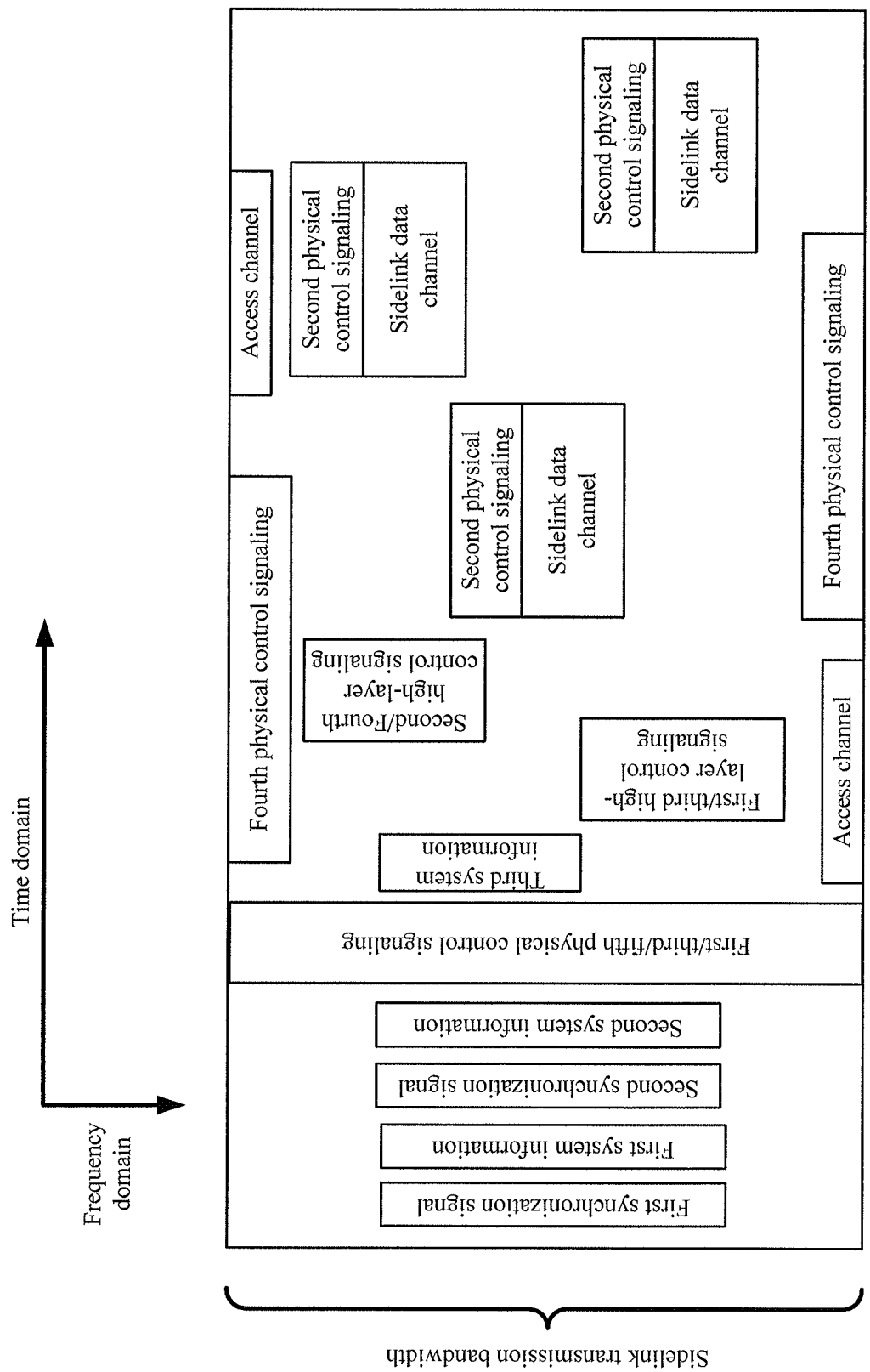
FIG. 8 and FIG. 9 illustrate schematic diagrams of time and frequency resources occupied for the embodiment shown in FIG. 5.
Figure 9:
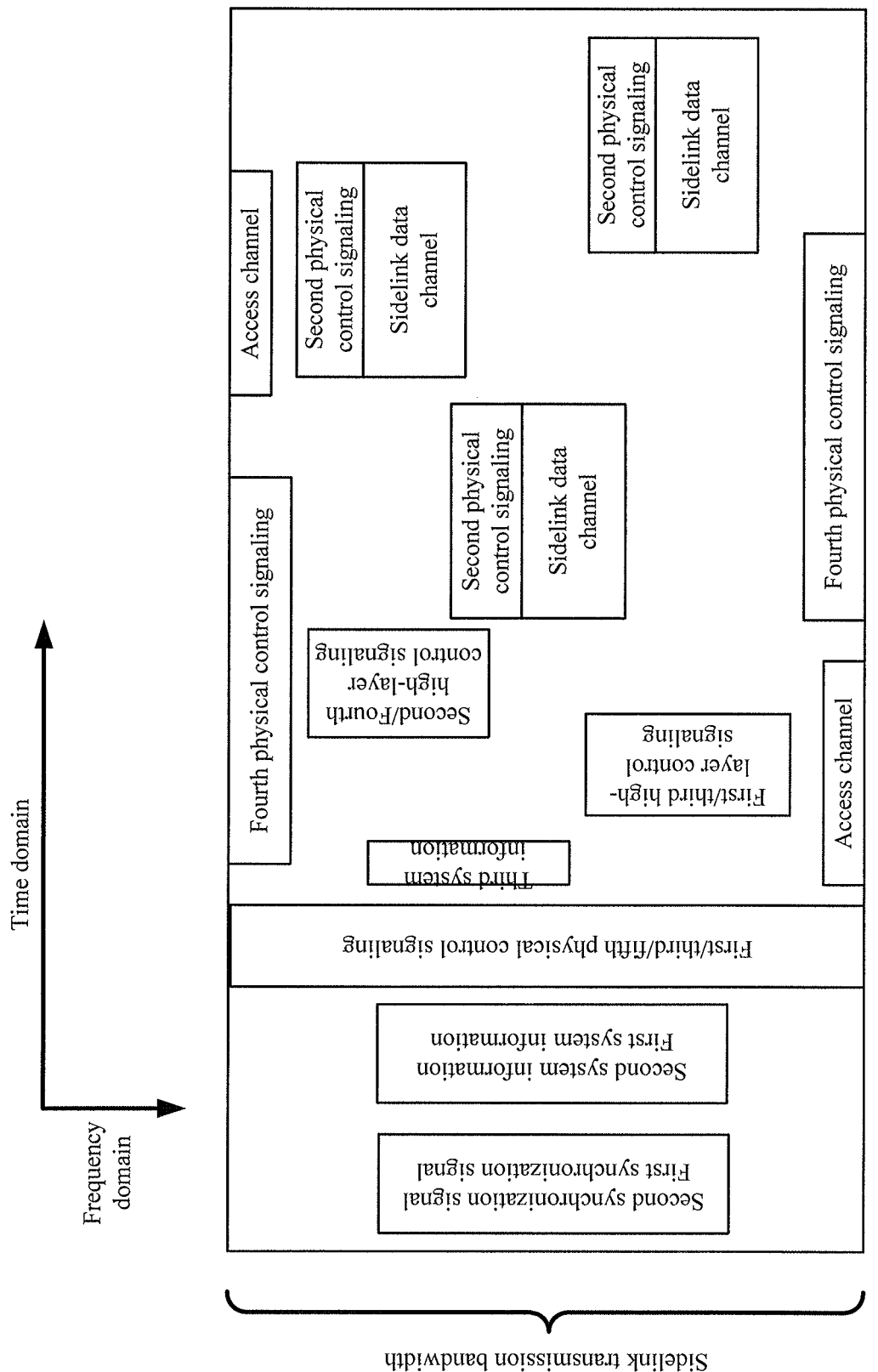

FIG. 8 and FIG. 9 illustrate schematic diagrams of time and frequency resources occupied by signals, information, signaling and the like in FIG. 5 respectively.

In the embodiment of the disclosure, a synchronization signal (including the first synchronization signal and the second synchronization signal) may be formed by a synchronization sequence. Moreover, different terminals may use different synchronization sequences, so that the terminals receiving synchronization signals may distinguish the signals. For example, the scheduling terminal 31 may determine a first synchronization sequence statically configured in a set of sequences (that is, the first synchronization sequence is statically configured in the set of sequences), and the transmitting terminal 25 may dynamically select a second synchronization sequence used by itself from the set of sequences.

The synchronization signal may be periodically transmitted on a preconfigured time-frequency resource, the number and locations of frames, subframes and symbols occupied by the synchronization signal in a time-domain period may be preset, and a central segment of a sidelink transmission bandwidth may always be occupied for transmitting the synchronization signal in frequency domain.

All first synchronization signals (i.e., first synchronization signals transmitted by multiple type-2 terminals) may share the same transmission resource, and the first synchronization signals transmitted by different type-2 terminals may be distinguished by different sequences, that is, multiple first synchronization signals transmitted by the multiple type-2 terminals are Code Division Multiplexed (CDM). All second synchronization signals (i.e., second synchronization signals transmitted by multiple type-1 terminals) may share the same transmission resource, and the second synchronization signals transmitted by different type-1 terminals may be distinguished by different sequences, that is, multiple second synchronization signals transmitted by the multiple type-1 terminals are CDM.

Specifically, there may be two structures for multiplexing between the first synchronization signals and the second synchronization signals.

The first structure is shown in FIG. 6 and FIG. 8, in which the first synchronization signals and the second synchronization signals occupy different time-domain transmission resources, that is, they are Time Division Multiplexed (TDM). Under this condition, the first synchronization signals and the second synchronization signals may use the same synchronization sequence, and terminal receiving the synchronization signals may distinguish whether the first synchronization signals or the second synchronization signals are received through the location of the time-domain resource.

The second structure is shown in FIG. 7 and FIG. 9, in which the first synchronization signals and the second synchronization signals may share the same transmission resource, that is, they are CDM. Under this condition, the first synchronization signals and the second synchronization signals may use different synchronization sequence sets (that is, first synchronization sequences are statically configured from a first synchronization sequence set and second synchronization sequences are dynamically selected from a second synchronization sequence set), and the terminals receiving the synchronization signals may distinguish whether the first synchronization signals or the second synchronization signals are received through the sequence sets to which the sequences belong.

In the embodiment of the disclosure, User Equipment (UE)-specific scrambling may be applied to the first system information and the second system information, and the terminal receiving the first system information or the second system information may adopt different scrambling codes for descrambling, thereby distinguishing the system information from different terminals. A scrambling code used by a type-1 terminal is bound with the synchronization sequence used by the type-1 terminal, and a scrambling code used by a type-2 terminal is bound with the synchronization sequence used by the type-2 terminal. The first system information and the second system information may be periodically transmitted on a preconfigured time-frequency resource, the numbers and locations of frames, subframes and symbols occupied by them in a time-domain period may be preset, and a central segment of the sidelink transmission bandwidth is always occupied for transmitting the first system information and the second system information in the frequency domain.

All first system information (i.e., first system information transmitted by multiple type-2 terminals) may share the same transmission resource, and the first system information transmitted by different type-2 terminals may be distinguished by different scrambling codes, that is, multiple pieces of first system information transmitted by the multiple type-2 terminals are CDM. All second system information (i.e., second system information transmitted by multiple type-1 terminals) may share the same transmission resource, and the second system information transmitted by different type-1 terminals may be distinguished by different scrambling codes, that is, multiple pieces of second system information transmitted by the multiple type-1 terminals are CDM.

Specifically, there may be two structures for multiplexing between the first system information and the second system information.

The first structure is shown in FIG. 6 and FIG. 8, wherein the first system information and the second system information occupy different time-domain transmission resources, that is, they are TDM. Under this condition, the first system information and the second system information may be scrambled with the same scrambling code, and terminals receiving the system information may distinguish whether the first system information or the second system information is received through locations of the time-domain resources.

The second structure is shown in FIG. 7 and FIG. 9, in which the first system information and the second system information may share the same transmission resource, that is, they are CDM. Under this condition, the first system information and the second system information may be scrambled with different scrambling codes, and the terminal receiving the system information may distinguish whether the first system information or the second system information is received through the scrambling code.

In the embodiment of the disclosure, the first physical control signaling (and the third physical control signaling and fifth physical control signaling in FIG. 5) is periodically transmitted on a basically fixed time-frequency resource. Alternatively, the frequency-domain resource may be preconfigured, a starting location of the time-domain resource is also preconfigured, and a time-domain length may be semi-statically configured by the first system information. In the first physical control signaling (and the third physical control signaling and fifth physical control signaling in FIG. 5), different time-frequency resources occupied by control information of different type-1 terminals (i.e., multiple transmitting terminals 25) may be TDM and/or Frequency Division Multiplexed (FDM).

In the embodiment of the disclosure, a time-frequency resource occupied by the access channel may be semi-statically allocated by the type-2 terminal (i.e., the scheduling terminal 31) in the third system information in FIG. 5, and its frequency-domain location may be at two ends of the sidelink transmission bandwidth, as shown in FIG. 8 and FIG. 9.

In the embodiment of the disclosure, a frequency-domain location of the fourth physical control signaling may be at the two ends of the sidelink transmission bandwidth, as shown in FIG. 8 and FIG. 9.

In the embodiment of the disclosure, a time-frequency resource occupied by the third system information in FIG. 4 or FIG. 5 may be dynamically allocated by the first physical control signaling.

In the embodiment of the disclosure, a time-frequency resource occupied by the first/third high-layer control signaling may be dynamically allocated by the third physical control signaling. A time-frequency resource occupied by the second/fourth high-layer control signaling may be dynamically allocated by the third physical control signaling.

In the embodiment of the disclosure, a time-frequency resource occupied by the second physical control signaling may be dynamically scheduled by the first physical control signaling, or is autonomously selected by the terminal (i.e., the transmitting terminal 25) transmitting the second physical control signaling from the sidelink resource pool.

In the embodiment of the disclosure, a time-frequency resource occupied by a sidelink data channel is dynamically scheduled by the first physical control signaling, or is autonomously selected by the terminal (i.e., the transmitting terminal 25) transmitting the sidelink data channel from the sidelink resource pool.

From the descriptions about FIG. 6 to FIG. 9, it can be seen that time-frequency structures of the added sidelink signals, information, signaling and the like are designed in the embodiments of the disclosure. Therefore, the sidelink time-frequency resource may be fully and reasonably used, and a resource utilization rate may be increased.

Figure 10:
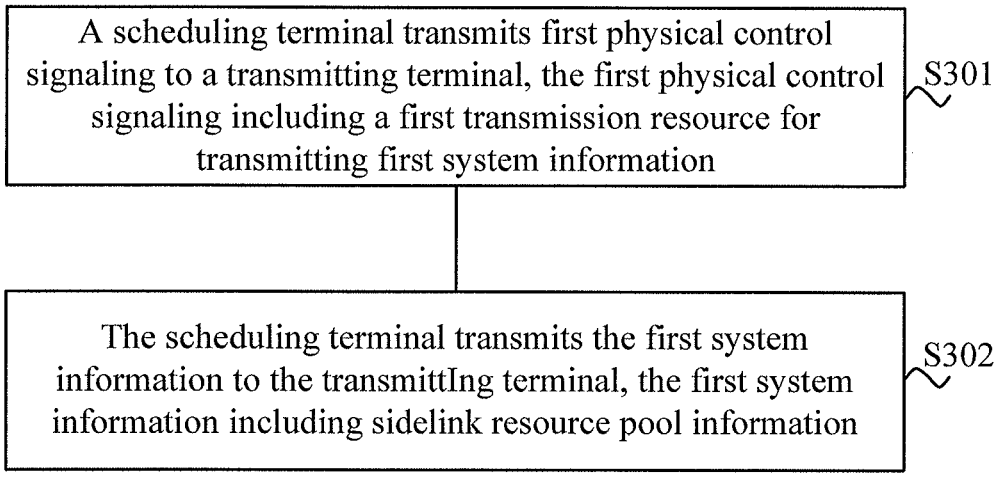
FIG. 10 illustrate a flowchart of a method for data transmission via a sidelink according to an embodiment of the disclosure.

FIG. 10 illustrate a flowchart of a method for data transmission via a sidelink according to an embodiment of the disclosure. The method shown in FIG. 10 is executed by a scheduling terminal and includes the following operations.

In S301, the scheduling terminal transmits first physical control signaling to a transmitting terminal. The first physical control signaling includes a first transmission resource for transmitting first system information.

In S302, the scheduling terminal transmits the first system information to the transmitting terminal. The first system information includes sidelink resource pool information.

S301 in FIG. 10 may be seen from S105 in the embodiment of FIG. 4 and S302 in FIG. 10 may be seen from S106 in the embodiment of FIG. 4, that is, the first system information in FIG. 10 is equivalent to the third system information in FIG. 4.

Alternatively, as an embodiment, before S301, the method further includes transmitting second system information to the transmitting terminal, the second system information including a second transmission resource, to enable the transmitting terminal to receive the first physical control signaling according to the second transmission resource. The operation may be seen from S103 in the embodiment of FIG. 4 or FIG. 5, that is, the second system information mentioned here is equivalent to the first system information in FIG. 4 or FIG. 5.

Alternatively, as another embodiment, the method further includes receiving a sidelink resource SR and a sidelink BSR of the transmitting terminal transmitted by the transmitting terminal, and transmitting sidelink resource scheduling grant information to the transmitting terminal according to the sidelink resource SR. Specifically, second physical control signaling transmitted by the transmitting terminal may be received, the second physical control signaling including the sidelink resource SR; and first high-layer control signaling transmitted by the transmitting terminal may be received, the first high-layer control signaling including the sidelink BSR of the transmitting terminal. The operations may be seen from S215 and S216 in the embodiment of FIG. 5, that is, the second physical control signaling mentioned here is equivalent to the fourth physical control signaling in FIG. 5 and the first high-layer control signaling mentioned here is equivalent to the fourth high-layer control signaling in FIG. 5. Correspondingly, the operation of transmitting the sidelink resource scheduling grant information to the transmitting terminal may be seen from S217 in FIG. 5.

Alternatively, as another embodiment, before the sidelink resource SR and the sidelink BSR of the transmitting terminal transmitted by the transmitting terminal are received, the method further includes determining that a connection has been successfully established with the transmitting terminal, and transmitting second high-layer control signaling to the transmitting terminal, the second high-layer control signaling including an ID of the transmitting terminal. The sidelink resource SR and the sidelink BSR of the transmitting terminal are transmitted after the transmitting terminal receives the second high-layer control signaling including the ID of the transmitting terminal. The operations may be seen from S213 and S214 in the embodiment of FIG. 5, that is, the second high-layer control signaling mentioned here is equivalent to the third high-layer control signaling in FIG. 5.

Alternatively, as another embodiment, before it is determined that the connection has been successfully established with the transmitting terminal, the method further includes executing a process of establishing the connection with the transmitting terminal.

Here, the process of establishing the connection with the transmitting terminal includes that: third system information is transmitted to the transmitting terminal, the third system information including resource configuration information of an access channel; the access channel transmitted by the transmitting terminal is received, the access channel including an access preamble signal; a transmission delay with the transmitting terminal is determined according to the access preamble signal; third physical control signaling is transmitted to the transmitting terminal, the third physical control signaling including feedback resource configuration information; third high-layer control signaling is transmitted to the transmitting terminal, the third high-layer control signaling including third transmission resource configuration information and a transmission-delay-based clock regulation instruction; fourth high-layer control signaling transmitted by the transmitting terminal is received, the fourth high-layer control signaling including the ID of the transmitting terminal; and it is determined whether the connection has been successfully established with the transmitting terminal. The feedback resource configuration information is used for the transmitting terminal to receive the third high-layer control signaling on a feedback resource, and the fourth high-layer control signaling is transmitted on a third transmission resource after the transmitting terminal regulates a clock according to the clock regulation instruction. The operations may be seen from descriptions about S206 to S213 in FIG. 5, that is, the third system information mentioned here is equivalent to the third system information in FIG. 5, the third physical control signaling mentioned here is equivalent to the third physical control signaling in FIG. 5, the third high-layer control signaling mentioned here is equivalent to the first high-layer control signaling in FIG. 5, and the fourth high-layer control signaling mentioned here is equivalent to the second high-layer control signaling in FIG. 5.

Alternatively, as another embodiment, before the first physical control signaling is transmitted to the transmitting terminal, the method further includes transmitting a synchronization signal to the transmitting terminal, the synchronization signal including a transmitting clock of the scheduling terminal and an ID of the scheduling terminal. The operation may be seen from descriptions about S101 in the embodiment of FIG. 4 or FIG. 5, that is, the synchronization signal mentioned here is equivalent to the first synchronization signal in FIG. 4 or FIG. 5.

In the embodiment of the disclosure, a frequency-domain location occupied by the access channel may be at two ends of a sidelink transmission bandwidth. A frequency-domain location occupied by the synchronization signal may be in the center of the sidelink transmission bandwidth.

Figure 11:
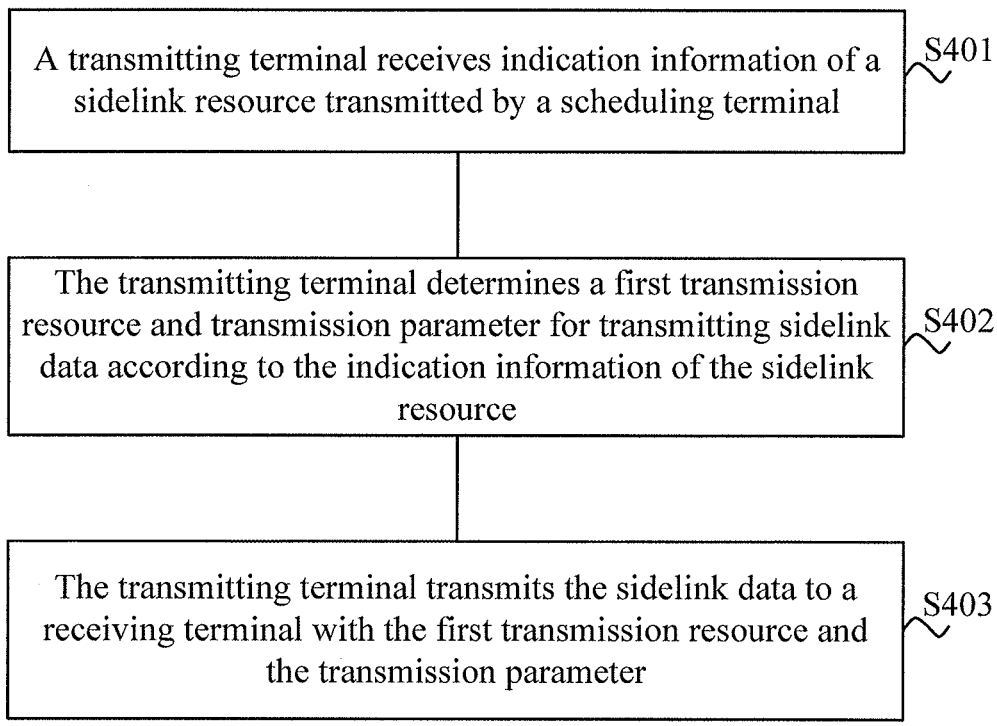
FIG. 11 illustrate a flowchart of a method for data transmission via a sidelink according to another embodiment of the disclosure.

FIG. 11 illustrate a flowchart of a method for data transmission via a sidelink according to another embodiment of the disclosure. The method shown in FIG. 11 is executed by a transmitting terminal and includes the following operations.

In S401, the transmitting terminal receives indication information of a sidelink resource transmitted by a scheduling terminal.

In S402, the transmitting terminal determines a first transmission resource and a transmission parameter for transmitting sidelink data according to the indication information of the sidelink resource.

In S403, the transmitting terminal transmits the sidelink data to a receiving terminal with the first transmission resource and the transmission parameter.

S401 in FIG. 11 may be seen from S106 in the embodiment of FIG. 4 or S217 in the embodiment of FIG. 5, S402 in FIG. 11 may be seen from S107 in the embodiment of FIG. 4 or S218 in the embodiment of FIG. 5 and S403 in FIG. 11 may be seen from S109 in the embodiment of FIG. 4 or FIG. 5, that is, the first transmission resource in FIG. 11 is equivalent to the sidelink transmission resource in FIG. 4 or FIG. 5.

Thus it can be seen that the indication information of the sidelink resource in FIG. 11 may be the sidelink resource pool information included in S106, or, may be the sidelink resource scheduling grant information in S217.

Alternatively, as an embodiment, before S403, the method may further include transmitting first physical control signaling to the receiving terminal, the first physical control signaling including the first transmission resource and the transmission parameter. The operation may be seen from S108 in the embodiment of FIG. 4 or FIG. 5, that is, the first physical control signaling mentioned here is equivalent to the second physical control signaling in FIG. 4 or FIG. 5.

Alternatively, as another embodiment, the indication information of the sidelink resource includes sidelink resource pool information, and S402 may include autonomously selecting the first transmission resource and transmission parameter for transmitting the sidelink data from the sidelink resource pool information.

Alternatively, as another embodiment, before S401, the method may further include receiving second transmission resource configuration information transmitted by the scheduling terminal. Correspondingly, S401 may include receiving first system information transmitted by the scheduling terminal according to the second transmission resource configuration information, the first system information including the sidelink resource pool information. The first system information mentioned here is equivalent to the third system information in FIG. 4.

For example, second system information transmitted by the scheduling terminal may be received, the second system information including third transmission resource configuration information; and second physical control signaling transmitted by the scheduling terminal is received according to the third transmission resource configuration information, the second physical control signaling including the second transmission resource configuration information. The operations may be seen from S103 and S105 in the embodiment of FIG. 4, that is, the second system information mentioned here is equivalent to the first system information in FIG. 4 and the second physical control signaling mentioned here is equivalent to the first physical control signaling in FIG. 4.

The second system information further includes: information about whether the scheduling terminal is in coverage of a base station and a system configuration parameter of the scheduling terminal. The system configuration parameter includes a transmitting bandwidth and/or a multi-antenna configuration.

Alternatively, as another embodiment, the indication information of the sidelink resource includes sidelink resource scheduling grant information, and before S401, the method may further include transmitting a sidelink resource SR and a sidelink BSR of the transmitting terminal to the scheduling terminal. Specifically, third physical control signaling may be transmitted to the scheduling terminal, the third physical control signaling including the sidelink resource SR; and first high-layer control signaling may be transmitted to the scheduling terminal, the first high-layer control signaling including the sidelink BSR of the transmitting terminal. The operations may be seen from S215 and S216 in the embodiment of FIG. 5, that is, the third physical control signaling mentioned here is equivalent to the fourth physical control signaling in FIG. 5 and the first high-layer control signaling mentioned here is equivalent to the fourth high-layer control signaling in FIG. 5.

Alternatively, as another embodiment, before the sidelink resource SR and the sidelink BSR of the transmitting terminal are transmitted to the scheduling terminal, the method may further include receiving second high-layer control signaling transmitted by the scheduling terminal, the second high-layer control signaling including indication information indicating that a connection has been successfully established and fourth transmission resource configuration information, and the indication information indicates that the scheduling terminal has successfully established the connection with the transmitting terminal. The operation may be seen from S214 in the embodiment of FIG. 5, that is, the second high-layer control signaling mentioned here is equivalent to the third high-layer control signaling in FIG. 5.

Correspondingly, the operation of transmitting the sidelink resource SR and the sidelink BSR of the transmitting terminal to the scheduling terminal may include: after determining that the connection has been successfully established, transmitting the sidelink resource SR and the sidelink BSR of the transmitting terminal to the scheduling terminal according to the fourth transmission resource configuration information.

Alternatively, as another embodiment, before the second high-layer control signaling transmitted by the scheduling terminal is received, the method may further include executing a process of establishing the connection with the scheduling terminal.

Here, the process of establishing the connection with the scheduling terminal may include that: third system information transmitted by the scheduling terminal is received, the third system information including resource configuration information of an access channel; the access channel is transmitted to the scheduling terminal according to the resource configuration information of the access channel, the access channel including an access preamble signal; fourth physical control signaling transmitted by the scheduling terminal is received, the fourth physical control signaling including feedback resource configuration information; third high-layer control signaling transmitted by the scheduling terminal is received according to the feedback resource configuration information, the third high-layer control signaling including fifth transmission resource configuration information and a clock regulation instruction; a clock of the transmitting terminal is regulated according to the clock regulation instruction; and fourth high-layer control signaling transmitted is transmitted to the scheduling terminal according to the fifth transmission resource configuration information, the fourth high-layer control signaling including a terminal ID of the transmitting terminal. The operations may be seen from descriptions about S206 to S212 in the embodiment of FIG. 5, that is, the third system information mentioned here is equivalent to the third system information in FIG. 5, the fourth physical control signaling mentioned here is equivalent to the third physical control signaling in FIG. 5, the third high-layer control signaling mentioned here is equivalent to the first high-layer control signaling in FIG. 5 and the fourth high-layer control signaling mentioned here is equivalent to the second high-layer control signaling in FIG. 5.

Before the indication information of the sidelink resource transmitted by the scheduling terminalis received, the method may further include receiving the second system information transmitted by the scheduling terminal, the second system information including the third transmission resource configuration information. Correspondingly, the operation of receiving the third system information transmitted by the scheduling terminal includes receiving the third system information transmitted by the scheduling terminal according to the third transmission resource configuration information. The operations may be seen from S105 and S206 in the embodiment of FIG. 5.

The second system information may further include: the information about whether the scheduling terminal is in the coverage of the base station and the system configuration parameter of the scheduling terminal. The system configuration parameter includes the transmitting bandwidth and/or the multi-antenna configuration.

Alternatively, as another embodiment, before S401, the method may further include transmitting fourth system information to the receiving terminal, the fourth system information including: indication information about whether the transmitting terminal is in the coverage of the base station, indication information about whether the transmitting terminal is in coverage of the scheduling terminal and a transmitting bandwidth of the transmitting terminal. The operation may be seen from S104 in the embodiment of FIG. 4 or FIG. 5, that is, the fourth system information mentioned here is equivalent to the second system information in FIG. 4 or FIG. 5.

Alternatively, as another embodiment, before S401, the method may further include that: a first synchronization signal transmitted by the scheduling terminal is received, the first synchronization signal including a transmitting clock of the scheduling terminal; and a second synchronization signal is transmitted to the receiving terminal, the second synchronization signal including the transmitting clock of the transmitting terminal. The operations may be seen from S101 and S102 in the embodiment of FIG. 4 or FIG. 5.

In the embodiment of the disclosure, a frequency-domain location occupied by the access channel may be at two ends of a sidelink transmission bandwidth. Frequency-domain locations occupied by the first synchronization signal and/or the second synchronization signal may be in the center of the sidelink transmission bandwidth.

The second system information and the fourth system information occupy different sidelink time-domain transmission resources and are TDM. Or, the second system information and the fourth system information occupy the same sidelink transmission resource and are CDM.

The first synchronization signal and the second synchronization signal occupy different sidelink time-domain transmission resources and are TDM. Or, the first synchronization signal and the second synchronization signal occupy the same sidelink transmission resource and are CDM.

Figure 12:
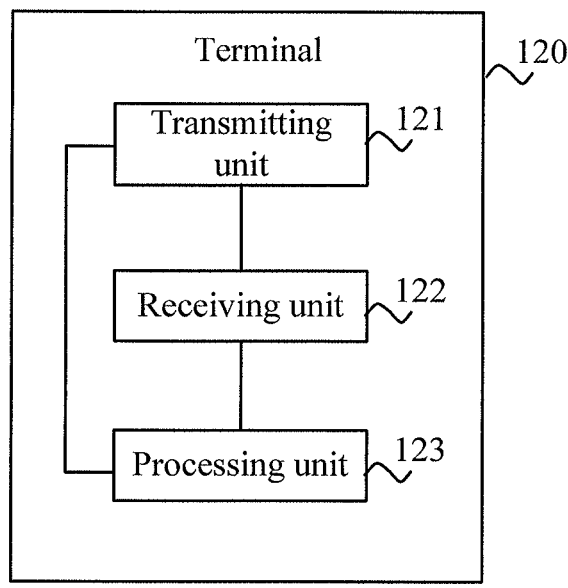
FIG. 12 illustrates a structure block diagram of a terminal according to an embodiment of the disclosure.

FIG. 12 illustrates a structure block diagram of a terminal according to an embodiment of the disclosure. The terminal 120 shown in FIG. 12 may be a scheduling terminal for data transmission via a sidelink, and includes: a transmitting unit 121, a receiving unit 122 and a processing unit 123.

The transmitting unit 121 is configured to transmit first physical control signaling to a transmitting terminal, the first physical control signaling including a first transmission resource for transmitting first system information. The transmitting unit 121 is further configured to transmit the first system information to the transmitting terminal, the first system information including sidelink resource pool information.

The transmitting unit 121 is configured to transmit information, signaling and the like to the transmitting terminal, as mentioned in S101, S103, S105, S106, S206, S209, S210, S214 and S217 in the abovementioned method embodiments. The receiving unit 122 is configured to receive a channel, signaling and the like transmitted by the transmitting terminal, as mentioned in S207, S212, S215 and S216 in the method embodiment shown in FIG. 5. The processing unit 123 is configured to execute operations of determination or judgment and the like, as mentioned in S208 and S213 in the method embodiment shown in FIG. 5.

Figure 13:
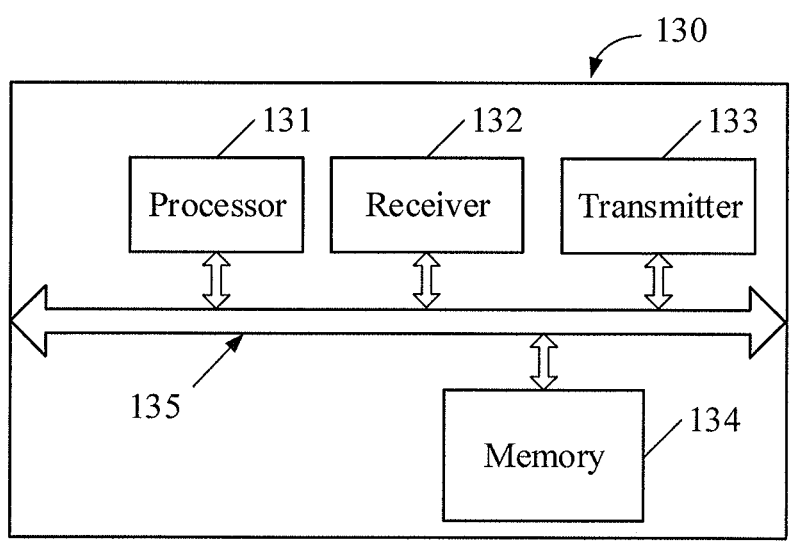
FIG. 13 illustrates a structure block diagram of a terminal according to another embodiment of the disclosure.

It is to be noted that, in the embodiment of the disclosure, the transmitting unit 121 may be implemented by a transmitter, the receiving unit 122 may be implemented by a receiver and the processing unit 123 may be implemented by a processor. As shown in FIG. 13, a terminal 130 may include a processor 131, a receiver 132, a transmitter 133 and a memory 134. The memory 134 may be configured to store the abovementioned signaling, information and the like, and may further be configured to store codes executable by the processor 131 and the like.

Components in the terminal 130 are coupled together through a bus system 135. The bus system 135 includes a data bus, and further includes a power bus, a control bus and a status signal bus.

The terminal 120 shown in FIG. 12 or the terminal 130 shown in FIG. 13 may implement each process implemented by the scheduling terminal in the method embodiments of FIG. 4, FIG. 5, FIG. 10 and FIG. 11 and will not be elaborated herein to avoid repetitions.

Figure 14:
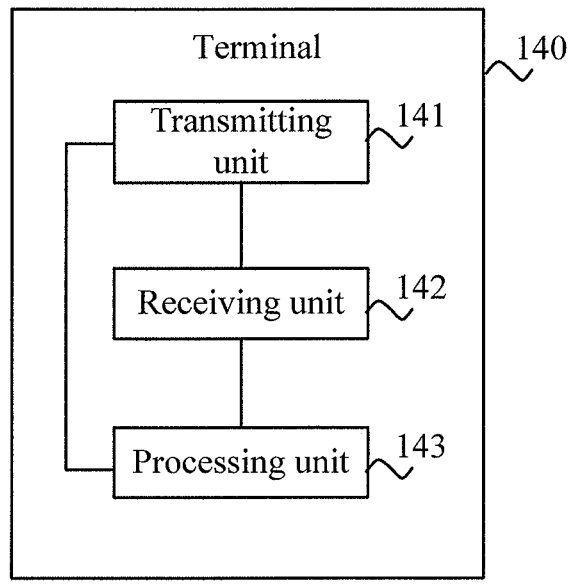
FIG. 14 illustrates a structure block diagram of a terminal according to another embodiment of the disclosure.

FIG. 14 illustrates a structure block diagram of a terminal according to an embodiment of the disclosure. The terminal 140 shown in FIG. 14 may be a transmitting terminal for data transmission via a sidelink, and includes: a transmitting unit 141, a receiving unit 142 and a processing unit 143.

The receiving unit 142 is configured to receive indication information of a sidelink resource transmitted by a scheduling terminal. The processing unit 143 is configured to determine a first transmission resource and transmission parameter for transmitting sidelink data according to the indication information of the sidelink resource. The transmitting unit 141 is configured to transmit the sidelink data to a receiving terminal with the first transmission resource and the transmission parameter.

The transmitting unit 141 is configured to transmit information, signaling and the like to the scheduling terminal, as mentioned in S207, S212, S215 and S216 in the abovementioned method embodiments. The transmitting unit 141 is further configured to transmit information, signaling and the like to the receiving terminal, as mentioned in S102, S104, S108 and S109 in the abovementioned method embodiments. The receiving unit 142 is configured to receive a channel, signaling and the like transmitted by the transmitting terminal, as mentioned in S101, S103, S105, S106, S206, S209, S210, S214 and S217 in the method embodiment shown in FIG. 5. The processing unit 143 is configured to execute operations of determination or regulation and the like, as mentioned in S107, S211 and S218 in the method embodiment shown in FIG. 5.

Figure 15:
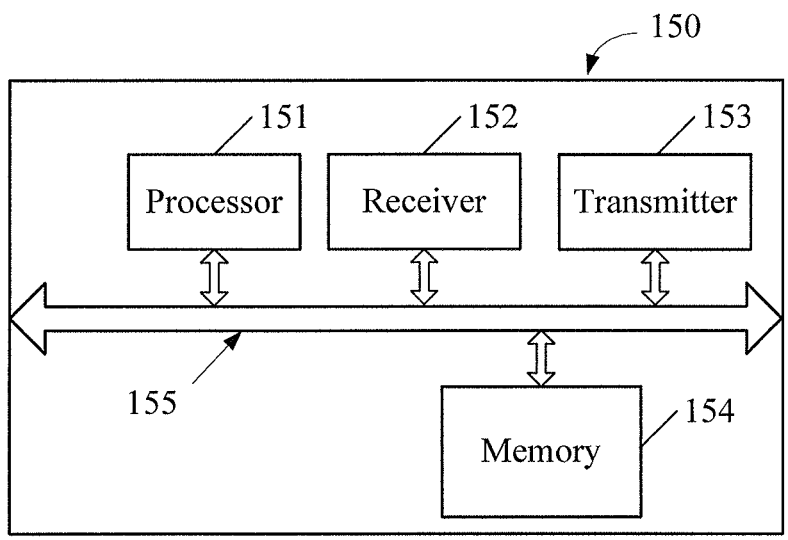
FIG. 15 illustrates a structure block diagram of a terminal according to another embodiment of the disclosure.

It is to be noted that, in the embodiment of the disclosure, the transmitting unit 141 may be implemented by a transmitter, the receiving unit 142 may be implemented by a receiver, and the processing unit 143 may be implemented by a processor. As shown in FIG. 15, a terminal 150 may include a processor 151, a receiver 152, a transmitter 153 and a memory 154. The memory 154 may be configured to store the abovementioned signaling, information and the like, and may further be configured to store codes executable by the processor 151 and the like.

Components in the terminal 150 are coupled together through a bus system 155. The bus system 155 includes a data bus, and further includes a power bus, a control bus and a status signal bus.

The terminal 140 shown in FIG. 14 or the terminal 150 shown in FIG. 15 may implement each process implemented by the transmitting terminal in the method embodiments of FIG. 4, FIG. 5, FIG. 10 and FIG. 11 and will not be elaborated herein to avoid repetitions.

Those of ordinary skilled in the art may realize that the units and algorithm steps of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application with different methods, but such realization shall fall within the scope of the disclosure.

Those skilled in the art may clearly learn about that specific working processes of the system, device and unit described above may be seen from the corresponding processes in the method embodiment and will not be elaborated herein for convenient and brief description.

In some embodiments provided by the application, it should be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each function unit in each embodiment of the disclosure may be integrated into a processing unit, each unit may also exist independently, and two or more than two units may also be integrated into a unit.

When being realized in form of software function unit and sold or used as an independent product, the function may also be stored in a computer-readable storage medium. Based on such an understanding, the technical solutions of the disclosure substantially or parts making contributions to the conventional art or part of the technical solutions may be embodied in form of software product, and the computer software product is stored in a storage medium, including a plurality of instructions configured to enable a piece of computer equipment (which may be a personal computer, a server, network equipment or the like) to execute all or part of the operations of the method in each embodiment of the disclosure. The abovementioned storage medium includes: various media capable of storing program codes such as a U disk, a mobile hard disk, a Read-Only Memory (ROM), a Random Access Memory (RAM), a magnetic disk or an optical disk.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A sidelink data transmission method, comprising:
  transmitting, by a scheduling terminal, first physical control signaling to a transmitting terminal, wherein the first physical control signaling comprises a first transmission resource for transmitting first system information; and
  transmitting, by the scheduling terminal, the first system information to the transmitting terminal, wherein the first system information comprises sidelink resource pool information,
  wherein the method further comprises:
  receiving second physical control signaling transmitted by the trasmitting terminal, wherein the second physical control signaling comprises the sidelink resource SR; and
  receiving first high-layer control signaling transmitted by the transmitting terminal, wherein the first high-layer signaling comprises the sidelink BSR of the transmitting terminal; and
  transmitting sidelink resource scheduling grant information to the transmitting terminal according to the sidelink resource SR,
  wherein before receiving the sidelink resource SR transmitted by the transmitting terminal and the sidelink BSR of the transmitting terminal, the method further comprises:
  executing a process of establishing the connection with the transmitting terminal;
  determining that a connection has ben successfully established with the transmitting terminal; and
  transmitting second high-layer control signaling to the transmitting terminal, wherein the second high-layer control signaling comprises an Identity (ID) of the transmitting terminal,
  wherein the sidelink resource SR and the sidelink BSR of the transmitting terminal are transmitted after the transmitting terminal receives the second high-layer control signaling comprising the ID of the transmitting terminal,
  wherein the process of establihing the connection with the transmitting terminal comprises:
  trasmitting third system information to the transmitting terminal, the third system information comprises resource configuration information of an access channel;
  receiving the access channel transmitted by transmitting terminal, wherein the access channel comprises an access preamble signal;
  determining a transmission delay with the transmitting terminal according to the access preamble signal;
  transmitting third physical control signaling to the transmitting terminal, wherein the third physical control signaling comprises feedback resource configuration information;
  transmitting third high-layer control signaling to the transmitting terminal, wherein the third high-layer control signaling comprises third transmission resource configuration information and a transmission-delay-based clock regulation instruction;
  receiving fourth high-layer control signaling transmitted by the transmitting terminal, wherein the fourth high-layer control signaling comprises the ID of the transmitting terminal; and
  determining whether the connection has been successfully established with the transmitting terminal,
  wherein the feedback resource configutation information is used for the transmitting terminal to receive the third high-layer control signaling on a feedback resource, and the fourth high-layer control signaling is transmitted on a third transmission after the transmitting terminal regulates a clock according to the clock regulation instruction.

2. The method according to claim 1, wherein before transmitting the first physical control signaling to the transmitting terminal, the method further comprises:
transmitting second system information to the transmitting terminal, wherein the second system information comprises a second transmission resource, to enable the transmitting terminal to receive the first physical control signaling according to the second transmission resource.

3. The method according to claim 1, wherein the access channel occupies two ends of a sidelink transmission bandwidth in frequency domain.

4. The method according to claim 1, wherein before transmitting the first physical control signaling to the transmitting terminal, the method further comprises:
transmitting a synchronization signal to the transmitting terminal, wherein the synchronization signal comprises a transmitting clock of the scheduling terminal and the ID of the scheduling terminal.

5. The method according to claim 4, wherein the synchronization signal occupies a center of a sidelink transmission bandwidth in frequency domain.

6. A method for data transmission via a sidelink, comprising:
receiving, by a transmitting terminal, indication information of a sidelink resource transmitted by a scheduling terminal;
determining, by the transmitting terminal, a first transmission resource and transmission parameter for transmitting sidelink data according to the indication information of the sidelink resource; and
transmitting, by the transmitting terminal, the sidelink data to a receiving terminal with the first transmission resource and the transmission parameter;
wherein the indication information of the sidelink resource comprises sidelink resource pool information, and
determining the first transmission resource and transmission parameter for transmitting the sidelink data according to the indication information of the sidelink resource comprises:
autonomously selecting the first transmission resource and transmission parameter for transmitting the sidelink data from the sidelink resource pool information,
wherein the indication information of the sidelink resource comprises sidelink resource scheduling grant information, and
before receiving the indication information of the sidelink resource transmitted by the scheduling terminal, the method further comprises:
transmitting third physical control signaling to the scheduling terminal, wherein the third physical control signaling comprising the sidelink resource SR; and
transmitting first high-layer control signaling to the scheduling terminal, wherein the first high-layer control signaling comprises the sidelink BSR of the transmitting terminal,
wherein before transmitting the sidelink resource SR and the sidelink BSR of the transmitting terminal to the scheduling terminal, the method further comprises:
executing a process of establishing the connection with the scheduling terminal;
receiving second high-layer control signaling transmitted by the scheduling terminal, wherein the second high-layer control signaling comprises indication information indicating that a connection has been successfully established and fourth transmission resource configuration information, wherein the indication information indicates that the scheduling terminal has successfully established the connection with the transmitting terminal, and
transmitting the sidelink resource SR and the sidelink BSR of the transmitting terminal to the scheduling terminal comprises:
after determining that the connection has been successfully established, transmitting the sidelink resource SR and the sidelink BSR of the transmitting terminal to the scheduling terminal according to the fourth transmission resource configuration information,
wherein the process of establishing the connection with the scheduling terminal comprises:
receiving third system information trasmitted by the scheduling terminal, wherein the third system information comprises resource configuration information of an access channel;
transmitting the access channel to the scheduling terminal according to the resource configuration information of the access channel, wherein the access channel comprises an access preamble signal;
receiving fourth physical control signaling transmitted by the scheduling terminal, wherein the fourth physical control signaling comprises feedback resource configutaion information;
receiving third high-layer control signaling transmitted by the scheduling terminal according to the feedback resource configuration information, wherein the third high-layer control signaling comprises fifth transmission resource configuration information and a clock regulation instruction;
regulating a clock of the transmitting terminal according to the clock regulation instruction; and
transmitting fourth high-layer control signaling to the scheduling terminal according to the fifth transmission resource configuration information, wherein the fourth high-layer control signaling comprises a terminal Identity (ID) of the transmitting terminal.

7. The method according to claim 6, wherein before transmitting the sidelink data to the receiving terminal, the method further comprises:
transmitting first physical control signaling to the receiving terminal, wherein the first physical control signaling comprises the first transmission resource and the transmission parameter.

8. The method according to claim 6, wherein before receiving the indication information of the sidelink resource transmitted by the scheduling terminal, the method further comprises:
receiving second system information transmitted by the scheduling terminal, wherein the second system information comprises third transmission resource configuration information; and
receiving second physical control signaling transmitted by the scheduling terminal according to the third transmission resource configuration information, wherein the second physical control signaling comprises the second transmission resource configuration information,
wherein receiving the indication information of the sidelink resource transmitted by the scheduling terminal comprises: receiving first system information transmitted by the scheduling terminal according to the second transmission resource configuration information, wherein the first system information comprises the sidelink resource pool information.

9. The method according to claim 6, wherein the access channel occupies two ends of a sidelink transmission bandwidth in frequency domain.

10. The method according to claim 6, wherein before receiving the indication information of the sidelink resource transmitted by the scheduling terminal, the method further comprises:
receiving the second system information transmitted by the scheduling terminal, wherein the second system information comprises the third transmission resource configuration information, wherein
receiving the third system information transmitted by the scheduling terminal comprises:
receiving the third system information transmitted by the scheduling terminal according to the third transmission resource configuration information.

11. The method according to claim 6, wherein before receiving the indication information of the sidelink resource transmitted by the scheduling terminal, the method further comprises:
transmitting fourth system information to the receiving terminal, wherein the fourth system information comprises: indication information about whether the transmitting terminal is in coverage of the base station, indication information about whether the transmitting terminal is in coverage of the scheduling terminal and a transmitting bandwidth of the transmitting terminal.

12. The method according to claim 6, wherein before receiving the indication information of the sidelink resource transmitted by the scheduling terminal, the method further comprises:
receiving a first synchronization signal transmitted by the scheduling terminal, wherein the first synchronization signal comprises a transmitting clock of the scheduling terminal; and
transmitting a second synchronization signal to the receiving terminal, wherein the second synchronization signal comprises the transmitting clock of the transmitting terminal.

13. A terminal, wherein the terminal is a scheduling terminal for data transmission via a sidelink and comprises:
a transmitter, configured to transmit first physical control signaling to a transmitting terminal, the first physical control signaling comprising a first transmission resource for transmitting first system information, wherein
the transmitter is further configured to transmit the first system information to the transmitting terminal, wherein the first system information comprises sidelink resource pool information,
wherein the terminal further comprising a receiver, wherein
the receiver is configured to receive a second physical control signaling transmitted by the transmitting terminal, wherein the second physical control signaling comprises the sidelink resource SR;
the receiver is further configured to receive first high-layer control signaling transmitted by the transmitting terminal, wherein the first high-layer control signaling comprises the sidelink BSR of the transmitting terminal; and
the transmitter is specifically configured to transmit sidelink resource scheduling grant information to the transmitting terminal according to the sidelink resource SR,
wherein the terminal further comprising a processor, wherein the processor is configured to execute a process of establishing the conncetion with the transmitting terminal;
the processor is configured to determined that a connection has been successfully established with the transmitting terminal; and
the processor is further configured to transmit second high-layer control signaling to the transmitting terminal, wherein the second high-layer control signaling comprises an Identity (ID) of the transmitting terminal,
wherein the sidelink resource SR and the sidelink BSR of the transmitting terminal are transmitted after the transmitting terminal receives the second high-layer control signaling comprising the ID of the transmitting terminal,
wherein
the transmitter is further configured to transmit third system information to the transmitting terminal, wherein the third system information comprises resource configuration information os an access channel;
the receiver is further configured to receive the access channel transmitted by the transmitting terminal, the access channel comprising an access preamble signal;
the processor is further configured to determine a transmission delay with the transmitting terminal according to the access preamble signal;
the transmitter is further configured to transmit third physical control signaling to the transmitting terminal, wherein the third physical control signaling comprises feedback resource configuration information;
the transmitter is further configured to trasmit third high-layer control signaling to the transmitting terminal, wherein the third high-layer control signaling comprises third transmission resource configuration and a transmission-delay-based clock regulation instruction;
the receiver is further configured to receive fourth high-layer control signaling transmitted by the transmitting terminal, wherein the fourth high-layer control signaling comprises the ID of the transmitting terminal; and
the processor is further configured to determine whether the connection has been successfully established with the transmitting terminal;
wherein the feedback resource configuration information is used for the transmitting terminal to receive the third high-layer control signaling on a feedback resource, and the fourth high-layer control signaling is transmitted on a third transmission resource after the transmitting terminal regulates a clock according to the clock regulation instruction.

14. The terminal according to claim 13, wherein the transmitter is further configured to:
transmit second system information to the transmitting terminal, wherein the second system information comprises a second transmission resource, to enable the transmitting terminal to receive the first physical control signaling according to the second transmission resource.

15. The terminal according to claim 13, wherein the receiver is specifically configured to:
receive second physical control signaling transmitted by the transmitting terminal, wherein the second physical control signaling comprises the sidelink resource SR; and
receive first high-layer control signaling transmitted by the transmitting terminal, wherein the first high-layer control signaling comprises the sidelink BSR of the transmitting terminal.

16. The terminal according to claim 13, wherein the access channel occupies two ends of a sidelink transmission bandwidth in frequency domain.

17. The terminal according to claims 13, wherein
- the transmitter is further configured to transmit a synchronization signal to the transmitting terminal, wherein the synchronization signal comprises a transmitting clock of the scheduling terminal and the ID of the scheduling terminal.

18. The terminal according to claim 17, wherein the synchronization signal occupies a center of a sidelink transmission bandwidth in frequency domain.

* * * * *